(12) United States Patent
Ghouti et al.

(10) Patent No.: US 8,462,939 B2
(45) Date of Patent: Jun. 11, 2013

(54) RNS-BASED CRYPTOGRAPHIC SYSTEM AND METHOD

(75) Inventors: Lahouari Ghouti, Dhahran (SA); Mohammad K. Ibrahim, Leicester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 381 days.

(21) Appl. No.: 12/962,470

(22) Filed: Dec. 7, 2010

(65) Prior Publication Data
US 2012/0140920 A1 Jun. 7, 2012

(51) Int. Cl.
| H04L 9/00 | (2006.01) |
| H04L 9/28 | (2006.01) |
| H04L 9/32 | (2006.01) |
| H04K 1/00 | (2006.01) |
| H04K 3/00 | (2006.01) |
| G06F 7/38 | (2006.01) |

(52) U.S. Cl.
USPC ............... 380/28; 380/1; 380/44; 380/255; 708/491

(58) Field of Classification Search
None
See application file for complete search history.

(56) References Cited

U.S. PATENT DOCUMENTS

| 4,991,210 A | 2/1991 | Chaum |
| 5,077,793 A | 12/1991 | Falk et al. |
| 5,345,507 A * | 9/1994 | Herzberg et al. ............... 380/28 |
| 6,282,295 B1 | 8/2001 | Young et al. |
| 6,389,136 B1 | 5/2002 | Young et al. |
| 7,000,110 B1 | 2/2006 | Terao |
| 7,088,821 B2 | 8/2006 | Shaik |
| 7,200,225 B1 | 4/2007 | Schroeppel |
| 7,995,749 B2 * | 8/2011 | Michaels ....................... 380/28 |
| 8,190,892 B2 * | 5/2012 | Ghouti et al. ................. 713/168 |
| 2002/0186848 A1 | 12/2002 | Shaik |
| 2003/0108196 A1 | 6/2003 | Kirichenko |
| 2004/0223609 A1 | 11/2004 | Wu |
| 2005/0005125 A1 | 1/2005 | Zhang et al. |
| 2005/0018851 A1 | 1/2005 | Venkatesan et al. |
| 2005/0069135 A1 | 3/2005 | Brickell |
| 2006/0013389 A1 | 1/2006 | Harrison et al. |
| 2006/0117181 A1 | 6/2006 | Brickell |
| 2007/0076865 A1 | 4/2007 | Lauter et al. |
| 2010/0169657 A1 | 7/2010 | Ghouti et al. |

FOREIGN PATENT DOCUMENTS

EP 2503533 A1 * 9/2012

* cited by examiner

*Primary Examiner* — Philip Chea
*Assistant Examiner* — Fatoumata Traore
(74) *Attorney, Agent, or Firm* — Richard C. Litman

(57) ABSTRACT

The RNS-based cryptographic system and method uses a symmetric residue number system (RNS) for encryption and decryption of messages, i.e., the sender and receiver agree upon a set of relatively prime numbers, referred to as the basis, whose product is an integer, and both the RNS and the integer are kept secret. To break the cipher, an attacker must factor the secret integer, which is unknown to the attacker, given only the upper bound of the unknown integer, a problem referred to as blind factorization of the unknown integer, which is a computationally hard problem. The method may be combined with a discrete logarithm problem, and the ciphertext may be padded with random values to hide the upper bound of the unknown integer. When the ciphertext requires multiple blocks, subsets of the basis and/or the random number padding may be used to prevent collision attacks.

25 Claims, 1 Drawing Sheet

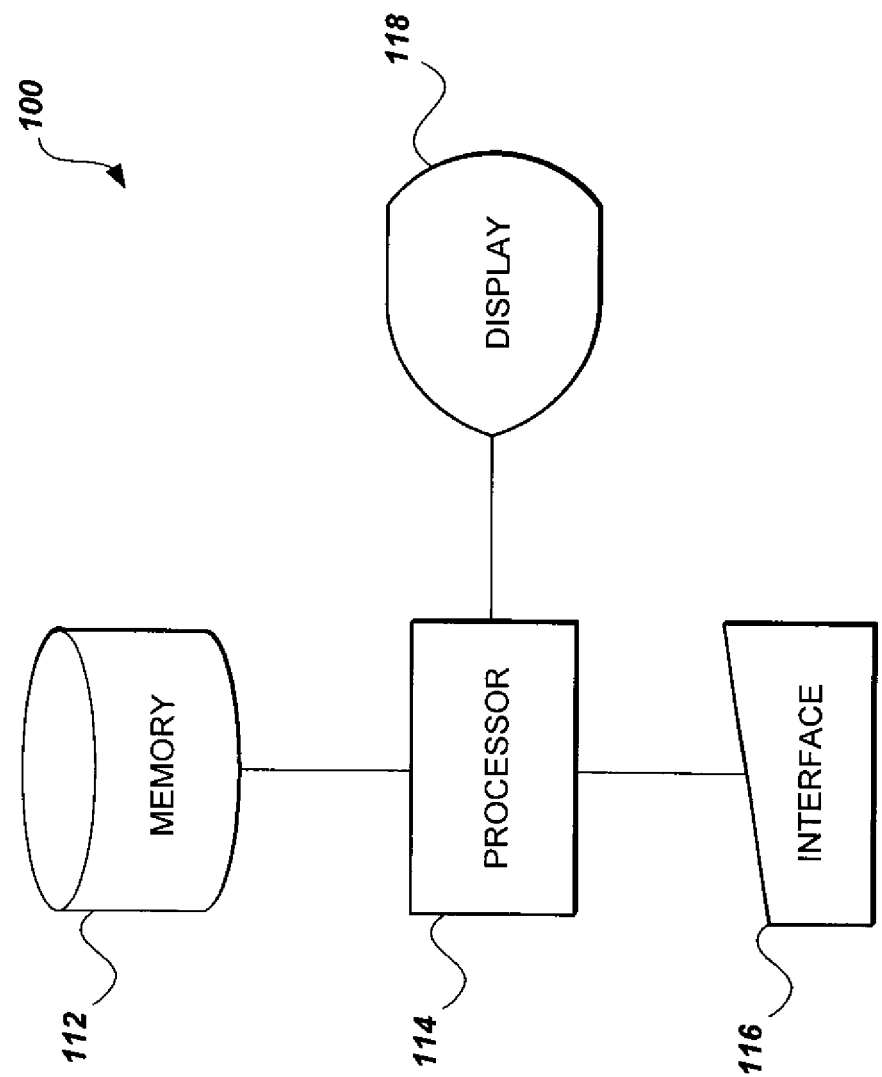

RNS-BASED CRYPTOGRAPHIC SYSTEM AND METHOD

BACKGROUND OF THE INVENTION

1. Field of the Invention

The present invention relates to computerized cryptographic systems and methods for encrypting communications in a computer network or electronic communications system, and particularly to an RNS-based cryptographic system and method that forces an attacker to perform blind factorization of an unknown integer from which the residue number system is derived, and which may also include blind randomization to further secure the system from attack.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain but rather rudimentary form of file protection. Once password protection is circumvented, a third party can access a stored file and then change it, with the owner of the file then being completely oblivious to any such change.

A residue number system (RNS) represents a large integer using a set of smaller integers, such that computation may be performed more efficiently. The RNS relies on the Chinese remainder theorem of modular arithmetic for its operation. In an RNS, the vector $\{p_1, p_2, \ldots, p_L\}$ forms a set of moduli, referred to as the RNS "basis" $\beta$, in which the moduli $\{p_1, p_2, \ldots, p_L\}$ are relatively prime with respect to one other. Using typical RNS convention, the product $$\prod_{l=1}^{L} p_l$$

is represented as p and defines the dynamic range of the system. The vector $\{m_1, m_2, \ldots m_L\}$ is the RNS representation of an integer M, which is less than P, where $m_l = \langle M \rangle_{p_l} = M \bmod p_l$. Any integer m belonging to the set $\{0, \ldots, P-1\}$ has a unique representation in the basis $\beta$.

Further, the operations of addition, subtraction, and multiplication are defined over the set $\{0, \ldots, P-1\}$ as:

$$C \pm D = (\langle c_1 \pm d_1 \rangle_{p_1}, \ldots, \langle c_L \pm d_L \rangle_{p_L}); \text{ and} \qquad (1)$$

$$C \times D = (\langle c_1 \times d_1 \rangle_{p_1}, \ldots, \langle c_L \times d_L \rangle_{p_L}). \qquad (2)$$

Equations (1) and (2) illustrate the parallel carry-free nature of RNS arithmetic. The reconstruction of m from its residues $\{m_1, m_2, \ldots, m_L\}$ is based on the Chinese Remainder Theorem:

$$M = \left\langle \sum_{l=0}^{L} \langle \mu_l m_l \rangle_{p_l} P_l \right\rangle_P, \qquad (3)$$

where $$P = \prod_{l=1}^{L} p_l; \qquad (4)$$

$$P_l = \frac{P}{p_l}; \text{ and} \qquad (5)$$

$$\mu_l = \langle P_l^{-1} \rangle_{p_l}. \qquad (6)$$

The vector $\{m_1, m_2, \ldots, m_L\}$, where $0 \leq m'_l < p_l$, is the Mixed Radix System (MRS) representation of an integer M less than P, such that $$M = m'_1 + m'_2 p_1 + m'_3 p_1 p_2 + \ldots + m'_L \prod_{i=1}^{L-1} p_i. \qquad (7)$$

It should be noted that, with regard to RNS equations (3) through (7), a change in any one of the residue values $m_l$ can have an effect on the whole number M.

Residue number systems are well known in computer systems. Residue number systems can convert the problem of arithmetic operations on a large integer to a series of simpler operations on small integers, with resulting efficiency in computation. However, although there have been some attempts to utilize residue number systems in cryptographic systems, these efforts are either still not computationally efficient or are vulnerable to attack.

Thus, a system and method for performing blind factorization-based residue number system encryption with blind randomization solving the aforementioned problems is desired.

SUMMARY OF THE INVENTION

The RNS-based cryptographic system and method uses a symmetric residue number system (RNS) for encryption and decryption of messages communicated over a communications channel, i.e., the sender and receiver agree upon a set of relatively prime numbers, referred to as the basis, whose product is an integer, and both the RNS and the integer are kept secret.

Although there are many variations described herein, in general, encryption is performed as follows. First, data strings corresponding to a plaintext message are embedded into message integers that are residues of corresponding members of the basis. Next, a set of cipher elements are formed by raising the message integer to a power, the result being modulo the corresponding member of the set of relatively prime numbers. When the power is 1, the message integer is multiplied by an integer base raised to a power, the result being modulo the corresponding member of the set of relatively prime numbers. In either case, the power is an agreed secret value. Next, the cipher elements are combined to form an integer vector, and the integer vector is converted into a cipher integer value using the RNS and the Chinese Remainder Theorem. This integer is sent to the receiving correspondent.

When an encrypted message is received, the cipher integer value is converted to the corresponding integer vector of cipher elements by determining the residues of the cipher integer value modulo the corresponding set of relatively prime numbers in the RNS. The cipher elements are converted to the corresponding message integers using the agreed upon secret power (and corresponding integer base, when used). The plaintext message is then recovered from the message integers.

The most that may be known by an attacker is an upper bound of the integer from which the RNS is derived, which can be determined from the binary length of the cipher integer value, if that value is not padded. In order to break the cipher, the attacker must factor the unknown integer knowing only the upper bound, which is a computationally hard problem. Integer factorization is computationally hard when the integer is known (this forms the security for the RSA algorithm, for example), but is even more difficult when only the upper bound is known, thereby forming the primary basis for security of the present system and method. In addition, if the attacker is able to solve the integer factorization problem, the attacker must also solve a discrete logarithm problem (either the message integer raised to a power other than 1, or a selected integer raised to a power other than one, the power being kept secret), which is also a computationally hard problem.

In addition to blind factorization, the method may use blind randomization for further security. Blind randomization is not employed when the plaintext is encrypted into the cipher elements, but is used to pad the cipher elements after the plaintext is encrypted. Moreover, the sending correspondent is able to change the randomization pattern from one block of the cipher to the next without prior agreement or synchronization with the receiving correspondent. In blind randomization, the sending correspondent generates a second residue number system in which the set contains elements that are relatively prime to each other and that are relatively prime to the elements of the first residue number system. The second residue number system is used to generate random values that are concatenated with the cipher elements used to compute the cipher integer. When the message bit string is too long to encrypt into one block, for the second block, the sending correspondent can change the number of elements in the second RNS, the values of the elements of the second RNS, and/or the mechanism used to generate the random numbers from the second RNS, all without prior agreement with the receiving correspondent and without communicating the change in the randomization pattern to the receiving correspondent. Blind randomization further hides from the attacker the number of elements in the first RNS and the upper bound of the unknown integer, making blind factorization even more difficult.

For still further security, when sending block ciphers using either Electronic Code Book (ECB) or Cipher Block Chaining, RNS basis hopping may be used for protection against collision attacks, such as birthdays attacks, which are sometimes effective when the same plaintext is encrypted into the same ciphertext. The RNS basis hopping may be used on the encryption basis, on the blind randomization basis, or both. In RNS hopping on the encryption basis, for each block of ciphertext, the sending correspond selects a subset of the basis that will be used to encrypt the plaintext message, and inserts a code in an agreed message element that advises the receiving correspondent which elements are used for encryption in the block, and which elements are not. In RNS hopping on the blind randomization basis, the sending correspondent uses a random subset of the elements of the second RNS (used to generate random elements to pad the cipher elements) for each block in the cipher.

These and other features of the present invention will become readily apparent upon further review of the following specification and drawings.

BRIEF DESCRIPTION OF THE DRAWINGS

The sole drawing FIGURE is a block diagram illustrating system components for a system for performing blind factorization-based residue number system encryption with blind randomization according to the present invention.

DETAILED DESCRIPTION OF THE PREFERRED EMBODIMENTS

The system and method for performing blind factorization-based residue number system encryption with blind randomization provides for improved secure communication over an insecure channel through the use of blind integer factorization. Blind randomization may be used as a further measure to make blind factorization even more secure against attacks, and RNS hopping of the encryption basis and/or the randomization basis may be used to make the resulting block ciphers more secure against collision attacks where the same plaintext is encrypted into the same ciphertext. It should be noted that, in the present method, all of the resulting block ciphers are scalable.

A conventional integer factorization problem is given by the following. Given a known integer P, find the prime numbers $p_l$ where $l=1, \ldots, L$, such that $$P = \prod_{l=1}^{L} p_l.$$

In contrast, blind integer factorization is given as follows. For an unknown integer P with a known upper bound, find the prime numbers $p_l$ where $l=1, \ldots, L$, such that $$P = \prod_{l=1}^{L} p_l.$$

Blind integer factorization can be seen as factorization of unknown integers into its prime factors using only knowledge about the upper bound of the integer. Thus, blind integer factorization is a computationally "hard" problem when compared with conventional integer factorization. In other words, the blind integer factorization problem is a more general problem than factoring a known integer P into its prime factors. It should be noted that only the upper bound of the integer P could be known to an attacker, but the actual value of P is not known. These issues make the blind integer factorization problem a much harder problem than factoring a known integer P into its prime factors.

Although there are many variations described herein, in general, encryption is performed as follows. First, data strings corresponding to a plaintext message are embedded into message integers that are residues of corresponding members of the basis. Next, a set of cipher elements are formed by raising the message integer to a power, the result being modulo the corresponding member of the set of relatively prime numbers. When the power is 1, the message integer is multiplied by an integer base raised to a power, the result being modulo the corresponding member of the set of relatively prime numbers. In either case, the power is an agreed secret value. Next, the cipher elements are combined to form an integer vector, and the integer vector is converted into a cipher integer value using the RNS and the Chinese Remainder Theorem. This integer is sent to the receiving correspondent.

When an encrypted message is received, the cipher integer value is converted to the corresponding integer vector of cipher elements by determining the residues of the integers modulo the corresponding set of relatively prime numbers in the RNS. The cipher elements are converted to the corresponding message integers using the agreed upon secret power (and corresponding integer base, when used). The plaintext message is then recovered from the message integers.

In the first step, data strings corresponding to a plaintext message are embedded into message integers that are residues of corresponding members of the basis. It should be understood that embedding the plaintext message may be accomplished by any suitable method of embedding message data bits into an integer m modulo p. In the following, it is assumed that an integer m modulo p requires N bits to represent its value. Further, $(mb_{N-1}, mb_{N-2}, \ldots, mb_0)$ is the binary representation of the integer value m, where $mb_i$ represents the i-th bit. Additionally, in the following examples of embedding methods, $(d_{Nd-1}, d_{Nd-2}, \ldots, d_0)$ denotes the message data bit string to be embedded into the integer m modulo p, which consists of Nd bits, where $d_i$ denotes the i-th bit of the message data bit string.

In a first embedding method, the residue value m carries information about the message data only. Thus, in order to guarantee the embedding of the whole message data string into the residue value m, the length of the data string must be $Nd \leq (N-1)$: Embedding at the sending correspondent may be done as follows. (1) Setting $mb_i = d_i$ for $i=0, \ldots, Nd-1$, thus using the Nd bits of the message data bit string as the Nd least significant bits of the integer m. (2) Setting the next (N−(Nd+1)) significant bits $mb_i$ for $i=Nd, \ldots, (N-2)$ of the integer value m randomly. (3) Setting the most significant bit $m_{N-1}$ of the integer m as:

$$mb_{N-1} = \begin{cases} 1 & \text{if the resulting value of } m < p \\ 0 & \text{if the resulting value of } m \geq p. \end{cases}$$

At the receiving correspondent, the bits of the message data block are recovered from the residue value m by taking the Nd least significant bits.

In some of the above embodiments, extra information needs to be sent by the sending correspondent regarding the bit patterns of the data block embedded in an integer m modulo p. One possible method is to use a parity check bit, which is also embedded into the same modulo value. In other words, in addition to the data block, an extra bit must be embedded into the same modulo value.

Thus, in this case, the length of the message data bit string must be $Nd \leq (N-2)$ in order to guarantee the embedding of the whole message data string into the residue value m. Embedding at the sending correspondent is done as follows. (1) Calculating the parity bit $d_p$ of the message data bit string $(d_{Nd-1}, d_{Nd-2}, \ldots, d_0)$ as $d_p = d_{Nd-1} \oplus d_{Nd-2} \oplus \ldots \oplus d_0$, where $\oplus$ denotes the exclusive-OR operation. (2) Setting the least significant bit $mb_0$ of the modulo value equal to the data block parity bit as $mb_0 = d_p$. (3) Setting $mb_i = d_{i-1}$ for $i=1, \ldots, Nd$, thus using the Nd bits of the message data bit string as the next Nd significant bits of the integer m. (4) Setting the next (N−(Nd+2)) significant bits $mb_i$ for $i=(Nd+1), \ldots, (N-2)$ of the integer value m randomly. (5) Setting the most significant bit $mb_{N-1}$ of the integer m as:

$$mb_{N-1} = \begin{cases} 1 & \text{if the resulting value of } m < p \\ 0 & \text{if the resulting value of } m \geq p. \end{cases}$$

At the receiving correspondent, the parity bits of the message data block are recovered from the residue value m by taking the least significant bit, and the bits of the message data block are recovered from the residue value m by taking the next Nd least significant bits.

In some embodiments, the message data bit string is embedded into L integers $m_l$ modulo $p_l$ for $l=1, \ldots, L$. Assume that an integer $m_l$ modulo $p_l$ can be represented using $N_l$ bits. Assuming that the message data bit string has a length of $N_s$ bits, then the limit on the number of bits $N_s$ of a message data string when using the first embedding method described above is $$N_s < \sum_{l=1}^{L} (N_l - 1).$$

A message data block with $N_s$ bits may embedded into L modulo integers $m_l$ for $l=1, \ldots, L$ in the following manner, assuming that the elements of the RNS basis $\{p_1, p_2, \ldots, p_L\}$ are ordered in decreasing value.

Embedding at the sending correspondent is done as follows. (1) Reading the next $(N_l-1)$ bits of the message data string. (2) Embedding the $(N_l-1)$ bits of the message data string into the integer value $m_l$ modulo p. (3) Repeating (1) and (2) for $l=1, \ldots, L$. Embedding the $(N_l-1)$ bits is done as follows. (1) Setting $mb_i = d_i$ for $i=0, \ldots, Nd-1$ thus using the Nd bits of the message data bit string as the Nd least significant bits of the integer m. (2) Setting the next (N−(Nd+1)) significant bits $mb_i$ for $i=Nd, \ldots, (N-2)$ of the integer value m randomly. (3) Setting the most significant bit $mb_{N-1}$ of the integer m as:

$$mb_{N-1} = \begin{cases} 1 & \text{if the resulting value of } m < p \\ 0 & \text{if the resulting value of } m \geq p. \end{cases}$$

At the receiving correspondent, the bits of the message data block are recovered from the residue value m by taking the Nd least significant bits.

A pre-processing stage may also be used prior to embedding a message data bit string into L modulo integers. It is assumed that the message data bit string consists of $N_s$ bits. $[d_{N_B-1}, d_{N_B-2}, \ldots, d_1]$ denotes a $N_s$-bit vector which represents the message data bit-string, where $d_i$ denotes the i-th bit of the data string.

At the sending correspondent, the data vector $[d_{N_B-1}, d_{N_B-2}, \ldots, d_1]$ is transformed into another $N_s$-bits vector $[dh_{N_B-1}, dh_{N_B-2}, \ldots, dh_1]$ using any isomorphic transformation $h(.)$ as $[dh_{N_B-1}, dh_{N_B-2}, \ldots, dh_1] = h([d_{N_B-1}, d_{N_B-2}, \ldots, d_1])$. The bits of the new vector $[dh_{N_B-1}, dh_{N_B-2}, \ldots, dh_1]$ are then embedded into the L integers $m_l$ modulo p, for $l=1, \ldots, L$, using the above embedding method.

At the receiving correspondent, the vector $[dh_{N_B-1}, dh_{N_B-2}, \ldots, dh_1]$ is first recovered from the integers $m_l$ modulo p, for $l=1, \ldots, L$, The data vector $[d_{N_B-1}, d_{N_B-2}, \ldots, d_1]$ is then recovered from the vector $[dh_{N_B-1}, dh_{N_B-2}, \ldots, dh_1]$ as $[d_{N_B-1}, d_{N_B-2}, \ldots, d_1] = h^{-1}([dh_{N_B-1}, dh_{N_B-2}, \ldots, dh_1])$. The advantage of using the pre-processing stage is to ensure that the message data block can be recovered only if all the bits of the vector $[dh_{N_B-1}, dh_{N_B-2}, \ldots, dh_1]$ are obtained, which means that an attacker must find all the elements used in the RNS basis $\{p_1, p_2, \ldots, p_L\}$. Therefore, partial factorization of the integer $$P = \prod_{l=1}^{L} p_l$$

is not sufficient to break the RNS protocols described herein.

After the plaintext message has been embedded into a set of message integers $m_l$, the next step in the method is to form a set of cipher elements. Methods of forming the cipher elements are described in the following examples, which, for convenience, also describe the subsequent steps for sending the encrypted message, and for decrypting a received message. For present purposes, it is useful to view the cipher elements as being formed according to the general formula:

$c_l = (m_l)^d \cdot g^k \mod p_l.$

In the above formula, if d=1, the formula reduces to:

$c_l = m_l \cdot g^k \mod p_l.$

Exemplary variations of RNS-based cryptographic methods according to this reduced formula are described in Examples 1-5. On the other hand, if k=0, the formula reduces to:

$c_l = (m_l)^d \mod p_l.$

Exemplary variations of RNS-based cryptographic methods according to this reduced formula are described in Examples 6-10.

In the following, the symbol ∈ denotes set membership, "gcd" denotes greatest common divisor, and $Z_p$ is used to denote the set $\{0, \ldots, p-1\}$.

Example 1

In a first embodiment, the sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis β given as $\beta = \{p_1, p_2, \ldots, p_L\}$; (b) agreeing on an integer $k_l \in Z_{p_l}$ for each element $p_l$, where $l=1, \ldots, L$, where each $k_l$ forms a part of the shared secret; (c) agreeing on an integer $g_l \in Z_{p_l}$ for each element $p_l$, where $l=1, \ldots, L$, such that mod $p_l$ exists, such that the integers $g_l$ could be part of a shared secret key or could be made public. The integers $g_l$ may also be chosen such that $g_i = g_j$ for $i=1, \ldots, L$ and $j=1, \ldots, L$; and (d) agreeing on an upper limit for a number of bits to be used to represent a ciphertext.

The sending correspondent then performs the following: (e) embedding message bit strings into L integer values $m_l$, where $l=1, \ldots, L$, such that $0 \leq m_l \leq p_l$ for $l=1, \ldots, L$; (f) computing a set of integer cipher elements $c_l$ modulo $p_l$ as $c_l = m_l \cdot (g_l^{-1})^{k_l}$ for $l=1, \ldots, L$; (g) combining the set of integer cipher element values $c_l$ for $l=1, \ldots, L$ to form a single integer vector $\{c_1, c_2, \ldots, c_L\}$; (h) converting the integer vector $\{c_1, c_2, \ldots, c_L\}$ into an integer value C using the Chinese remainder theorem and the basis β; and (i) sending the integer value C to the receiving correspondent.

To decrypt the message, the receiving correspondent performs the following: (j) generating the set of integer cipher elements $c_l$ using the set of elements $\{p_1, p_2, \ldots, p_L\}$ for $l=1, \ldots, L$ from the integer C as $c_l = C \mod p_l$; (k) computing the message element values $m_l$ modulo $p_l$ as $m_l = c_l \cdot g_l^{k_l} \mod p_l$; and (l) recovering the message bit string from the element values $m_l$ for $l=1, \ldots, L$.

It should be noted that the security in the above depends upon blind integer factorization of the integer $$P = \prod_{l=1}^{L} p_l,$$

which is unknown, as well as L discrete logarithm problems, provided that the blind integer factorization problem is resolved. It should be further noted that the Chinese remainder theorem (CRT) requires that the factors $\{p_1, p_2, \ldots, p_L\}$ of P need only be relatively prime with respect to one another. In other words, it is not necessary that each factor $p_l$ need to be a prime number itself. This implies that the blind integer factorization problem in this protocol is not factoring the integer P into its prime factors. The attacker would need to find the correct factors which are relatively prime to each other. For any non-prime integer, the factorization into relatively prime factors does not have to be unique. This makes the blind integer factorization problem even harder.

Information about the about upper bound of the value of $$P = \prod_{l=1}^{L} p_l$$

can be leaked from the number of bits used to represent the ciphertext C. An attacker can perform an exhaustive search for the possible values of P that are less than the upper bound, but it should be remembered that the attacker also needs to figure out the value of L; i.e., the number of prime factors. One cannot determine this value from a single integer value C that is sent from the sending correspondent to the receiving correspondent. It is clear that if neither the value of P nor the value of L is known, the problem becomes undetermined.

Additionally, the level of security is increased further in the case where the elements $g_l$ for $l=1, \ldots, L$ are not known. Further, it should be noted that the message data bits are embedded directly in the RNS domain and that the CRT is not performed at the receiving correspondent, which makes this protocol suitable for receiving devices that have limited power recourses, such as a mobile/wireless terminals. Further, it is relatively difficult to relate the value C to the vector $\{m_1, m_2, \ldots, m_L\}$ without knowledge of the basis $\beta$. It should also be noted that the strength is scalable, which can be simply achieved by either increasing the number of shared secret elements L and/or by using larger relatively prime numbers.

In the above, the exponentiation used in encryption and decryption is performed modulo the elements $p_l$ for $l=1, \ldots, L$. Since the strength of the protocol is primarily based on blind integer factorization, not all of the prime numbers used need to be large. In fact, a trade-off between computational efficiency and security exists, depending upon the choice of the size of the selected prime numbers. Further, it should be understood that making the values $g_l$ public will not leak any information about the elements $p_l$ for $l=1, \ldots, L$. In order to increase the efficiency, the values $g_l$ can be chosen such that their inverse is relatively easy to compute. As an example, if $g_l=2$, then the inverse is given by $$g_l = \frac{p_l + 1}{2}$$

for prime $p_l$. Since the elements $p_l$ are prime, $(p_l+1)$ is always even.

Further, efficiency can be improved by choosing the integers $k_l \ominus Z_{p_l}$ for each element $p_l$ to be either 1 or 2. It should be remembered that the security of the protocol depends primarily on the blind integer factorization problem. Additionally, one can always pad the bit string of the value of the ciphertext C with extra bits to confuse an attacker about the range of the ciphertext C and, thus, the upper bound of P.

Example 2

In order to reduce the number of computational steps, one exponentiation key may be used. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$, and wherein $p_{max} = \text{Max}(p_1, p_2, \ldots, p_L)$, where Max represents a maximum value operation, and $l_{max}=l$ for $l=1, \ldots, L$, where $p_{max}=p_l$; (b) agreeing on an integer $k_l \ominus Z_{p_l}$ where k forms a part of the shared secret; (c) agreeing on an integer $g \ominus Z_{p_{max}}$ where it is preferable that $\sqrt{g} \ominus Z_{p_{max}}$, such that the integer g could be part of a shared secret key or could be made public; and (d) agreeing on an upper limit for a number of bits to be used to represent a ciphertext.

The sending correspondent then performs the following: (e) embedding message bit strings into L integer values $m_l$, where $l=1, \ldots, L$, such that $0 \leq m_l < p_l$ for $l=1, \ldots, L$; (f) computing a value $g_{max}$ as $g_{max} = g^k \mod p_{max}$; (g) computing a set of integer cipher elements $c_l$ modulo $p_l$ as $c_{l=m_l} \cdot (g_{max}^{-1} \mod p_l) \mod p_l$ for $l=1, \ldots, L$; (h) combining the set of integer cipher element values $c_l$ for $l=1, \ldots, L$ to form a single integer vector $\{c_1, c_2, \ldots, c_L\}$; (i) converting the integer vector $\{c_1, c_2, \ldots, c_L\}$ into an integer value C using the Chinese remainder theorem and the basis $\beta$; and (j) sending the integer value C to the receiving correspondent.

To decrypt the message, the receiving correspondent performs the following: (k) generating the set of integer cipher elements $c_l$ using the set of elements $\{p_1, p_2, \ldots, p_L\}$ for $l=1, \ldots, L$ from the integer C as $c_l = C \mod p_l$; (l) computing the value $g_{max}$ as $g_{max} = g^k \mod p_{max}$; (m) computing the message element values $m_l$ modulo $p_l$ as $m_l = c_l \cdot g_{max} \mod p_l$; and (n) recovering the message bit string from the element values $m_l$ for $l=1, \ldots, L$.

Example 3

In this variation, flexibility is added in the changing of the encryption keys and the initialization phase is simplified: the sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ relatively prime with respect to one another and form a part of a shared secret key, and which are further used as a residue number system basis $\beta$ given as $\beta = \{p_1, p_2, \ldots, p_L\}$, and wherein $p_{max} = \text{Max}\{p_1, p_2, \ldots, p_L\}$, where Max represents a maximum value operation, and $l_{max}=l$ for $l=1, \ldots, L$, where $p_{max}=p_l$; and (b) agreeing on an upper limit for a number of bits to be used to represent a ciphertext.

The sending correspondent then performs the following: (c) embedding message bit strings into L integer values $m_l$, where $l=1, \ldots, L$ and $l_{max} \neq l$, such that $0 \leq m_l < p_l$ for $l=1, \ldots, L$; (d) selecting an integer $k \ominus Z_{p_{max}}$; (e) selecting an integer $g \ominus Z_{p_{max}}$, where it is preferable that $\sqrt{g} \ominus Z_{p_{max}}$; (f) computing a value $g_{max}$ as $g_{max} = g^k \mod p_{max}$; (g) computing a set of integer cipher elements $c_l$ modulo $p_l$ as $c_l = m_l \cdot (g_{max}^{-1} \mod p_l) \mod p_l$ for $l=1, \ldots, L$; (h) setting $c_{l_{max}} = g_{max}$; (i) combining the set of integer cipher element values $c_l$ for $l=1, \ldots, L$ to form a single integer vector $\{c_1, c_2, \ldots, c_L\}$; (j) converting the integer vector $\{c_1, c_2, \ldots, c_L\}$ into an integer value C using the Chinese remainder theorem and the basis $\beta$; and (k) sending the integer value C to the receiving correspondent.

The receiving correspondent then performs the following: (l) generating the set of integer cipher elements $c_l$ using the set of elements $\{p_1, p_2, \ldots, p_L\}$ for $l=1, \ldots, L$ from the integer C as $c_l = C \mod p_l$; (m) setting $g_{max} = c_{l_{max}}$; (n) computing the value $g_{max}$ as $g_{max} = g^k \mod p_{max}$; (o) computing the message element values $m_l$ modulo $p_l$ as $m_l = c_l \cdot g_{max} \mod p_l$; and (p) recovering the message bit string from the element values $m_l$ for $l=1, \ldots, L$.

It should be noted that, in the above, the sending correspondent can change the key k and the value of g for each individual block being encrypted. Information about the encrypting key is then sent as part of the ciphertext. This is similar to the one time pad. It should be remembered that the security of this protocol is still based on blind integer factorization.

Example 4

In the following alternative embodiment, computation is reduced even further. The sending and receiving correspondents both perform the following: (a) agreeing on a set of elements $\{p_1, p_2, \ldots, p_L\}$ where L is an integer greater than or equal to one, where the elements $\{p_1, p_2, \ldots, p_L\}$ relatively prime with respect to one another and form a part of a shared secret, and which are further used as a residue number system basis $\beta$ given as $\beta = \{p_1, p_2, \ldots, p_L\}$ without loss of generality, the elements $\{p_1, p_2, \ldots, p_L\}$ are listed in decreasing value, and wherein $p_{max} = \text{Max}(p_1, p_2, \ldots, p_L)$, where Max represents a maximum value operation, where $p_{max} = p_1$ and $p_1$ and $p_2$ are chosen to be prime; and (b) agreeing on an upper limit for a number of bits to be used to represent a ciphertext.

The sending correspondent then performs the following: (c) embedding message bit strings into L integer values where $l=2,\ldots,L$, such that $0 \leq m_l < p_l$ for $l=2,\ldots,L$; (d) selecting an integer $k \in Z_{p_{max}}$; (e) selecting an integer $g \in Z_{p_{max}}$, where it is preferable that $\sqrt{g} \in Z_{p_{max}}$; (f) computing a value $g_1$ as $g_1 = g^k \mod p_1$; (g) computing a cipher element $c_2$ modulo $p_2$ as $c_2 = m_2 \cdot (g_1^{-1} \mod p_2) \mod p_2$; (h) computing a set of cipher elements $c_l$ modulo $p_l$ for $l=3,\ldots,L$ as $c_l = (m_l + m_{l-1}) \mod p_l$; (i) setting $c_1 = g_1$; (j) combining the set of integer cipher element values $c_l$ for $l=1,\ldots,L$ to form a single integer vector $\{c_1, c_2, \ldots, c_L\}$; (k) converting the integer vector $\{c_1, c_2, \ldots, c_L\}$ into an integer value C using the Chinese remainder theorem and the basis $\beta$; and (l) sending the integer value C to the receiving correspondent.

The receiving correspondent then performs the following: (m) generating the set of integer cipher elements $c_l$ using the set of elements $\{p_1, p_2, \ldots, p_L\}$ for $l=1,\ldots,L$ from the integer C as $c_l = C \mod p_l$; (n) setting $g_1 = c_1$; (o) computing the first message element value $m_2$ modulo $p_2$ as $m_2 = c_2 \cdot g_1 \mod p_2$; (p) computing the message element values $m_l$ modulo $p_l$ for $l=3,\ldots,L-1$ as $m_l = (c_l - m_{l-1}) \mod p_l$; and (q) recovering the message bit string from the element values $m_l$ for $l=2,\ldots,L$.

Example 5

It is often desirable that the encryption method used not only provide privacy or confidentiality of messages, but also authenticity. This property guarantees that the only feasible way to produce a valid ciphertext is to apply the encryption function to some message M, which requires knowledge of the secret information. In this case, the secret information is the RNS basis $\{p_1, p_2, \ldots, p_L\}$. This is shown in the following alternative embodiment.

The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; (b) agreeing on an integer $k_l \in Z_{p_l}$ for each element $p_l$, where $l=1,\ldots,L$, and where the elements $p_l$ form a part of the shared secret; (c) agreeing on an integer $g_l \in Z_{p_l}$ for each element $p_l$, where $l=1,\ldots,L$, such that $g_l^{-1} \mod p_l$ exists, and where these integers may be part of the shared secret key or they may be made public and could be chosen such that $g_i = g_j$ for $i=1,\ldots,L$ and $j=1,\ldots,L$; and (d) agreeing on an upper limit for a number of bits to be used to represent a ciphertext.

The sending correspondent then performs the following: (e) embedding message bit strings into $L-1$ integer values $m_l$, where $l=1,\ldots,L$, such that $0 \leq m_l < p_l$ for $l=1,\ldots,L$ using a parity check embedding method; (f) computing a value $m_L$ as $$m_L = \left( \sum_{l=1}^{L-1} m_l \right) \mod p_L;$$

(g) computing a set of integer cipher elements $c_l$ modulo $p_l$ as $c_l = m_l \cdot (g_l^{-1})^{k_l} \mod p_l$ for $l=1,\ldots,L$; (h) combining the set of integer cipher element values $c_l$ for $l=1,\ldots,L$ to form a single integer vector $\{c_1, c_2, \ldots, c_L\}$; (i) converting the integer vector $\{c_1, c_2, \ldots, c_L\}$ into an integer value C using the Chinese remainder theorem and the basis $\beta$; and (j) sending the integer value C to the receiving correspondent.

The receiving correspondent then performs the following: (k) generating the set of integer cipher elements $c_l$ using the set of elements $\{p_1, p_2, \ldots, p_L\}$ for $l=1,\ldots,L$ from the integer C as $c_l = C \mod p_l$; (l) computing the message element values $m_l$ modulo $p_l$ as $m_l = c_l \cdot g_l^{k_l}$; (n) recovering the message bit strings and the corresponding parity bits from the element values $m_l$ for $l=1,\ldots,L$; (o) generating party check bits from the recovered message bit strings and computing the value $m_L$ as $$m'_L = \left( \sum_{l=1}^{L-1} m_l \right) \mod p_L;$$

and (p) checking if the generated parity check bits and parity bits recovered from the element values $m_l$ for $l=1,\ldots,L$ are equal, and if $m'_L = m_L$, then authenticating the decrypted message.

It should be noted that the above approach to authenticity can be applied to any of Examples 1-4.

Example 6

In this variation, the term "gcd" represents the greatest common divisor operation. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; (b) agreeing on an integer $e_l \in Z_{p_l}$ for each element $p_l$, where $l=1,\ldots,L$, such that $\gcd(e_l(p_l - 1))=1$, and where the elements $p_l$ form a part of the shared secret key; and (c) agreeing on an upper limit for a number of bits to be used to represent a ciphertext.

The sending correspondent then performs the following: (d) computing an integer $d_l$ for each element $p_l$ for $l=1,\ldots,L$, such that $e_l d_l \mod p_l = 1$; (e) embedding message bit strings into L integer values $m_l$, where $l=1,\ldots,L$, such that $0 \leq m_l < p_l$ for $l=1,\ldots,L$; (f) computing a set of integer cipher elements $c_l$ modulo $p_l$ as $c_l = m_l^{d_l} \mod p_l$ for $l=1,\ldots,L$; (g) combining the set of integer cipher element values $c_l$ for $l=1,\ldots,L$ to form a single integer vector $\{c_1, c_2, \ldots, c_L\}$; (h) converting the integer vector $\{c_1, c_2, \ldots, c_L\}$ into an integer value C using the Chinese remainder theorem and the basis $\beta$; and (i) sending the integer value C to the receiving correspondent.

The receiving correspondent then performs the following: (j) generating the set of integer cipher elements $c_l$ using the set of elements $\{p_1, p_2, \ldots, p_L\}$ for $l=1,\ldots,L$ from the integer C as $c_l = C \mod p_l$; (k) computing the message element values $m_l$ modulo $p_l$ as $m_l = c_l^{e_l} \mod p_l$; and (l) recovering the message bit strings from the element values $m_l$ for $l=1,\ldots,L$.

It should be noted that the security in the above depends upon blind integer factorization of the integer $$P = \prod_{l=1}^{L} p_l,$$

which is unknown, as well as L discreet logarithm problems, provided that the blind integer factorization problem is resolved. Information about the about upper bound of the value of $$P = \prod_{l=1}^{L} p_l$$

can be leaked from the number of bits used to represent the ciphertext C. An attacker can perform an exhaustive search for the possible values of P that are less than the upper bound, but it should be remembered that the attacker also needs to figure out the value of L; i.e., the number of prime factors. One cannot determine this value from a single integer value C that is sent from the sending correspondent to the receiving correspondent. It is clear that if neither the value of P nor the value of L is known, the problem becomes undetermined.

Additionally, the CRT is not performed at the receiving correspondent. This makes this protocol suitable for receiving devices which have limited power recourses, such as a wireless terminal, for example. It should be further noted that the computation to find the integers $d_l$ for each element $p_l$ over $l=1, \ldots, L$ is only performed at the sending correspondent. This also makes this protocol suitable for receiving devices that have limited power resources, such as wireless terminals. Further, it is relatively difficult to relate the value C to the vector $\{m_1, m_2, \ldots, m_L\}$ without knowledge of the basis $\beta$. It should also be noted that the strength is scalable, which can be simply achieved by either increasing the number of shared secret elements L and/or by using larger relatively prime numbers.

In the above, the exponentiation used in encryption and decryption is performed modulo the elements $p_l$ for $l=1, \ldots, L$. Since the strength of the protocol is primarily based on blind integer factorization, not all of the prime numbers used need to be large. In fact, a trade-off between computational efficiency and security exists, depending upon the choice of the size of the selected prime numbers. Further, it should be understood that one can always pad the bit string of the value of the ciphertext C with extra bits to confuse an attacker about the range of the ciphertext C and, thus, the upper bound of P.

Example 7

In this variation, the sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ relatively prime with respect to one another and form a part of a shared secret, and which are further used as a residue number system basis $\beta$ given as $\beta=\{p_1, p_2, \ldots, p_L\}$; and (b) agreeing on an upper limit for a number of bits to be used to represent a ciphertext.

The sending correspondent then performs the following: (c) selecting an integer $e_l \in Z_{p_l}$ for each element $p_l$, where $l=1, \ldots, L$, such that $\gcd(e_l, (p_l-1))=1$, and where the integer values $e_l$ are made public; (d) embedding message bit strings into L integer values $m_l$, where $l=1, \ldots, L$, such that $0 \leq m_l < p_l$ for $l=1, \ldots, L$; (e) computing a set of integer cipher elements $c_l$ modulo $p_l$ as $c_l = m_l^{e_l} \mod p_l$ for $l=1, \ldots, L$; (f) combining the set of integer cipher element values $c_l$ for $l=1, \ldots, L$ to form a single integer vector $\{c_1, c_2, \ldots, c_L\}$; (g) converting the integer vector $\{c_1, c_2, \ldots, c_L\}$ into an integer value C using the Chinese remainder theorem and the basis $\beta$; and (h) sending the integer value C to the receiving correspondent.

The receiving correspondent then performs the following: (i) generating the set of integer cipher elements $c_l$ using the set of elements $\{p_1, p_2, \ldots, p_L\}$ for $l=1, \ldots, L$ from the integer C as $c_l = C \mod p_l$; (j) computing an integer $d_l$ for each element $p_l$ for $l=1, \ldots, L$, such that $e_l d_l \mod p_l = 1$; (k) computing the message element values $m_l$ modulo $p_l$ as $m_l = c_l^{d_l} \mod p_l$; and (l) recovering the message bit strings from the element values $m_l$ for $l=1, \ldots, L$.

In the above, the advantage of making $e_l$ public is that the sending correspondent can change the key unilaterally without the need for a prior agreement with the receiving correspondent. Additionally, minimal information is leaked about the primes $p_l$ by the public information about the integers $e_l$ for $l=1, \ldots, L$ by the fact that $\gcd(e_l, (p_l-1))=1$, since many prime numbers can satisfy this condition.

Example 8

In this variation, redundant representation is utilized to reduce any leaking information which may occur by the public information regarding the integers $e_l$ for $l=1, \ldots, L$, by the fact that $\gcd(e_l, (p_l-1))=1$. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta=\{p_1, p_2, \ldots, p_L\}$; and (b) agreeing on an upper limit for a number of bits to be used to represent a ciphertext.

The sending correspondent then performs the following: (c) selecting an integer $e_l \in Z_{p_l}$ for each element $p_l$, where $l=1, \ldots, L$, such that $\gcd(e_l, (p_l-1))=1$; (d) computing a set of integer values $e'_l$ as $e'_l = e_l + s p_l$ for $l=1, \ldots, L$, wherein the integer values $e'_l$ are made public; (e) embedding message bit strings into L integer values $m_l$, where $l=1, \ldots, L$, such that $0 \leq m_l < p_l$ for $l=1, \ldots, L$; (f) computing a set of integer cipher elements $c_l$ modulo $p_l$ as $c_l = m_l^{e_l} \mod p_l$ for $l=1, \ldots, L$; (g) combining the set of integer cipher element values $c_l$ for $l=1, \ldots, L$ to form a single integer vector $\{c_1, c_2, \ldots, c_L\}$; (h) converting the integer vector $\{c_1, c_2, \ldots, c_L\}$ into an integer value C using the Chinese remainder theorem and the basis $\beta$; and (i) sending the integer value C to the receiving correspondent.

The receiving correspondent then performs the following: (j) generating the set of integer cipher elements $c_l$ using the set of elements $\{p_1, p_2, \ldots, p_L\}$ for $l=1, \ldots, L$ from the integer C as $c_l = C \mod p_l$; (k) computing the integer values $e'_l$ as $e_l = e'_l \mod p_l$ for $l=1, \ldots, L$; (l) computing an integer $d_l$ for each element $p_l$ for $l=1, \ldots, L$, such that $e_l d_l \mod p_l = 1$; (m) computing the message element values $m_l$ modulo $p_l$ as $m_l = c_l^{d_l} \mod p_l$; and (n) recovering the message bit strings from the element values $m_l$ for $l=1, \ldots, L$.

In the above, the use of redundant information adds additional uncertainty about the true values of $e_l$ for $l=1, \ldots, L$ and, thus, adds uncertainty on any useful information that might be inferred from the public integers $e'_l$ for $l=1, \ldots, L$.

Example 9

In this variation, one exponentiation key is used to reduce the number computations. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta=\{p_1, p_2, \ldots, p_L\}$; and (b) agreeing on an upper limit for a number of bits to be used to represent a ciphertext.

The sending correspondent then performs the following: (c) selecting an integer $e_l \in Z_{p_l}$ for each element $p_l$, where l=1, ..., L, such that $\gcd(e_l, (p_l-1))=1$, and where the integer values $e_l$ are made public; (d) embedding message bit strings into L integer values $m_l$, where l=1, ..., L, such that $0 \leq m_l < p_l$ for l=1, ..., L; (e) computing a first integer cipher element $c_l$ modulo $p_l$ as $c_l = m_l^{3l} \bmod p_l$; (f) computing a set of integer cipher elements $c_l$ modulo $p_l$ as $c_1(m_1 + m_{l-1}) \bmod p_l$ for l=2, ..., L; (g) combining the set of integer cipher element values $c_l$ for l=1, ..., L to form a single integer vector $\{c_1, c_2, ..., c_L\}$; (h) converting the integer vector $\{c_1, c_2, ..., c_L\}$ into an integer value C using the Chinese remainder theorem and the basis $\beta$; and (i) sending the integer value C to the receiving correspondent.

The receiving correspondent then performs the following: (j) generating the set of integer cipher elements $c_l$ using the set of elements $\{p_1, p_2, ..., p_L\}$ for l=1, ..., L from the integer C as $c_l = C \bmod p_l$; (k) computing an integer $d_l$ for each element $p_l$ for l=1, ..., L, such that $e_l d_l \bmod p_l = 1$; (l) computing a first message element value $m_l$ modulo $p_l$ as $m_l = c_l^{d_l} \bmod p_l$; (m) computing the message element values $m_l$ modulo $p_l$ as $m_l = (c_l - m_{l-1}) \bmod p_l$ for l=2, ..., L; and (l) recovering the message bit strings from the element values $m_l$ for l=1, ..., L.

Example 10

It is often desirable that the encryption method used not only provide privacy or confidentiality of messages, but also authenticity. This property guarantees that the only feasible way to produce a valid ciphertext is to apply the encryption function to some message M, which requires knowledge of the secret information. In this case, the secret information is the RNS basis $\{p_1, p_2, ..., p_L\}$. This is shown in the following alternative embodiment.

The sending and receiving correspondents both perform the following: (a) agreeing on a set of elements $\{p_1, p_2, ..., p_L\}$, where L is an integer greater than or equal to one, where the elements $\{p_1, p_2, ..., p_L\}$ are relatively prime with respect to one another and form a part of a shared secret, and which are further used as a residue number system basis $\beta$ given as $P = \{p_1, p_2, ..., p_L\}$; (b) agreeing on an integer $e_l \in Z_{p_l}$ for each element $p_l$, where l=1, ..., L, such that $\gcd(e_l, (p_l-1))=1$, and where the elements $e_l$ form a part of the shared secret key; and (c) agreeing on an upper limit for a number of bits to be used to represent a ciphertext.

The sending correspondent then performs the following: (d) computing an integer $d_l$ for each element $p_l$ for l=1, ..., L, such that $e_l d_l \bmod p_l = 1$; (e) embedding message bit strings into L-1 integer values where l=1, ..., L, such that $0 \leq m_l < p_l$ for l=1, ..., L using a parity check embedding method; (f) computing a value $m_L$ as $$m_L = \left(\sum_{l=1}^{L-1} m_l\right) \bmod p_L;$$

(g) computing a set of integer cipher elements $c_l$ modulo $p_l$ as $c_l = m_l^{d_l} \bmod p_l$ for l=1, ..., L; (h) combining the set of integer cipher element values c; for l=1, ..., L to form a single integer vector $\{c_1, c_2, ..., c_L\}$; (i) converting the integer vector $\{c_1, c_2, ..., c_L\}$ into an integer value C using the Chinese remainder theorem and the basis $\beta$; and (j) sending the integer value C to the receiving correspondent.

The receiving correspondent then performs the following: (k) generating the set of integer cipher elements $c_l$ using the set of elements $\{p_1, p_2, ..., p_L\}$ for l=1, ..., L from the integer C as $c_l = C \bmod p_l$; (l) computing the message element values $m_l$ modulo $p_l$ as $m_l = c_l^{e_l} \bmod p_l$; (n) recovering the message bit strings and the corresponding parity bits from the element values $m_l$ for l=1, ..., L; (o) generating party check bits from the recovered message bit strings and computing the value $m_L$ as $$m'_L = \left(\sum_{l=1}^{L-1} m_l\right) \bmod p_L;$$

and (p) checking if the generated parity check bits and parity bits recovered from the element values $m_l$ for l=1, ..., L are equal, and if $m'_L = m_L$, then authenticating the decrypted message.

It should be noted that the above approach to authenticity can be applied to any of Examples 6-9 described above.

Examples 1-10 describe cryptographic methods that rely only on blind factorization for their security. However, each of these embodiments may also be used with blind randomization in which the set of cipher elements is padded with random values. In blind randomization, random elements are not added during encryption of the plaintext message into the cipher elements, but are added to the cipher elements. Further, the random elements may be added and changed by the sending correspondent without synchronization with the receiving correspondent. Examples 11-20 illustrate the application of blind randomization to Examples 1-10.

Example 11

The sending and receiving correspondents both perform the following: (a) agreeing on a set of elements $\{p_1, p_2, ..., p_L\}$, where L is an integer greater than or equal to one, where the elements $\{p_1, p_2, ..., p_L\}$ are relatively prime with respect to one another and form a part of a shared secret, and which are further used as a residue number system basis $\beta$ given as $\beta = \{p_1, p_2, ..., p_L\}$; (b) agreeing on an integer $k_l \in Z_{p_l}$ for each element $p_l$, where l=1, ..., L, where each $k_l$ forms a part of the shared secret; (c) agreeing on an integer $g_l \in Z_{p_l}$ for each element $p_l$, where l=1, ..., L, such that $g_l^{-1} \bmod p_l$ exists, such that the integers $g_l$ could be part of the shared secret key or could be made public. The integers $g_l$ may also be chosen such that $g_i = g_j$ for i=1, ..., L and j=1, ..., L; and (d) agreeing on an upper limit for a number of bits to be used to represent a ciphertext.

The sending correspondent then performs the following: (e) selecting a set of elements $\{q_1, q_2, ..., q_J\}$ where J is an integer greater than zero and where the elements $\{q_1, q_2, ..., q_J\}$ are relatively prime with respect to one another and which are also relatively prime with respect to the elements $\{p_1, p_2, ..., p_L\}$, the set $\{q_1, q_2, ..., q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (f) forming the residue number system basis $\beta$ as $\{p_1, p_2, ..., p_L, q_1, q_2, ..., q_J\}$; (g) embedding message bit strings into L integer values ms, where l=1, ..., L, such that $0 \leq m_l < p_l$ for l=1, ..., L; (h) computing a set of integer cipher elements $c_l$ modulo $p_l$ as $c = m_l \cdot (g_l^{-1})^{k_l} \mod p_l$ for $l=1, \ldots, L$; (i) generating J random values $r_j$, where $j=1, \ldots, J$, such that $0 \leq r_j < q_j$ for $j=1, \ldots, J$; (j) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (k) converting the integer vector $\{c_1, c_2, \ldots, c_L, r_1, r_2, \ldots, r_J\}$ into an integer value C using the Chinese remainder theorem and the basis $\beta$; and (l) sending the integer value C to the receiving correspondent.

The receiving correspondent then performs the following: (m) generating the set of integer cipher elements $c_l$ using the set of elements $\{p_1, p_2, \ldots, p_L\}$ for $l=1, \ldots, L$ from the integer C as $c_l = C \mod p_l$; (n) computing the message element values $m_l$ modulo $p_l$ as $m_l = c_l \cdot g_l^{k_l} \mod p_l$; and (o) recovering the message bit string from the element values $m_l$ for $l=1, \ldots, L$.

It should be noted that, in blind randomization, the receiving correspondent does not need to know (i) the number of elements J; (ii) the values of the elements in the vector $\{q_1, q_2, \ldots, q_J\}$; (iii) the mechanisms used to generate the random numbers modulo the elements of $\{q_1, q_2, \ldots, q_J\}$; or (iv) the random numbers $\{r_1, r_2, \ldots, r_J\}$. These are known only to the sending correspondent. In other words, there is no need to synchronize the randomization between the sending and receiving correspondent.

When encrypting a message bit string which is longer than the number of bits that can be encrypted with one block, the sending correspondent can change (i) the number of elements J; (ii) the values of the elements in the vector $\{q_1, q_2, \ldots, q_J\}$; and (iii) the mechanisms used to generate the random numbers modulo the elements of $\{q_1, q_2, \ldots, q_J\}$ without the need to send any additional information about them to the receiving correspondent.

Blind randomization reduces the chances of collisions exploited in birthday attacks, since the same message bit string will be coded into two different cipher texts when using two different vectors of random numbers $\{r_1, r_2, \ldots, r_J\}$. Additionally, the message bit string can only be recovered from the elements of the integer vector $\{m_1, m_2, \ldots, m_L\}$, which cannot be obtained from the integer value C mod P directly. In other words, the message bit strings cannot be recovered without the knowledge of the RNS basis $\{p_1, p_2, \ldots, p_L\}$, which requires blind factorization of P, which is unknown. Therefore, using blind randomization does not degrade the security of blind factorization. In fact, security of blind factorization is enhanced when using blind randomization since the range of the ciphertext C, given by $$\prod_{l=1}^{L} p_l \prod_{j=1}^{J} q_j,$$

is much higher than the actual range of the message bit string given by $$P = \prod_{l=1}^{L} p_l.$$

As noted in the previous embodiments, the security strength of blind factorization depends on identifying the range P and then the corresponding shared secret elements in the basis $\{p_1, p_2, \ldots, p_L\}$. If identifying the range of P is made more difficult, the problem of blind factorization also becomes more difficult. It is difficult to relate the value C with the vector $\{m_1, m_2, \ldots, m_L\}$ without knowledge of the basis $\{p_1, p_2, \ldots, p_L\}$.

The only information that the knowledge of C leaks is its maximum range, which is $$\prod_{l=1}^{L} p_l \prod_{j=1}^{J} q_j.$$

One cannot determine the number of elements used in the RNS basis $\beta = \{p_1, p_2, \ldots, p_L, q_1, q_2, \ldots, q_J\}$ from knowledge of the range of C, since the elements $\{q_1, q_2, \ldots, q_J\}$ are relatively prime to each other and are relatively prime to the secret elements $\{p_1, p_2, \ldots, p_L\}$, and also because the factorization of C into relatively prime numbers is not unique. Similarly, the agreed upon upper limit for the number of bits used to represent the ciphertext does not leak any significant information for the same reasons.

Further, in the above, the strength is scalable, which can be simply achieved by either increasing the number of shared secret elements L and/or using larger relatively prime numbers. Additionally, there is no need to calculate the CRT at the receiving correspondent, which is very efficient and suitable for entities that have limitations in resources and/or are restricted by power consumption, such as mobile terminals.

In blind randomization, there is also no need for additional circuits at the receiving correspondent to generate the random numbers used at the sending correspondent, which may also be advantageous for devices with limited power resources.

Example 12

In order to reduce the number of computational steps, one exponentiation key is used, the sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$, and wherein $p_{max} = \text{Max}(p_1, p_2, \ldots, p_L)$, where Max represents a maximum value operation, and $1_{max} = 1$ for $l=1, \ldots, L$, where $p_{max} = p_l$; (b) agreeing on an integer $k \in Z_{p_{max}}$ where k forms a part of the shared secret key; (c) agreeing on an integer $g \in Z_{p_{max}}$ where it is preferable that $\sqrt{g} \notin Z_{p_{max}}$, such that the integer g could be part of the shared secret key or could be made public; and (d) agreeing on an upper limit for a number of bits to be used to represent a ciphertext.

The sending correspondent then performs the following: (e) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (f) forming the residue number system basis $\beta$ as $\{p_1, p_2, \ldots, p_L, q_1, q_2, \ldots, q_J\}$; (g) embedding message bit strings into L integer values $m_l$, where $l=1, \ldots, L$, such that $0 \leq m_l < p_l$ for $l=1, \ldots, L$; (h) computing a value $g_{max}$ as $g_{max} = g^k \mod p_{max}$; (i) computing a set of integer cipher elements $c_l$ modulo $p_l$ as $c_l = m_l \cdot (g_{max}^{-1} \mod p_l) \mod p_l$ for $l=1, \ldots, L$; (j) generating J random values $r_j$, where $j=1, \ldots, J$, such that $0 \leq r_j < q_j$ for $j=1, \ldots, J$; (k) combining the set of integer cipher element values $c_l$ for $l \leq 1, \ldots, L$ and the values $r_j$ for $j=1, \ldots, J$ to form a single integer vector $\{c_1, c_2, \ldots, c_L, r_1, r_2, \ldots, r_J\}$; (l) converting the integer vector $\{c_1, c_2, \ldots, c_L, r_1, r_2, \ldots, r_J\}$ into an integer value C using the Chinese remainder theorem and the basis $\beta$; and (m) sending the integer value C to the receiving correspondent.

The receiving correspondent then performs the following: (n) generating the set of integer cipher elements $c_l$ using the set of elements $\{p_1, p_2, \ldots, p_L\}$ for $l=1, \ldots, L$ from the integer C as $c_l = C \mod p_l$; (o) computing the value $g_{max}$ as $g_{max} = g^k \mod p_{max}$; (p) computing the message element values $m_l$ modulo $p_l$ as $m_l = c_l \cdot g_{max} \mod p_l$; and (q) recovering the message bit string from the element values $m_l$ for $l=1, \ldots, L$.

Example 13

In a further alternative embodiment, flexibility is added in the changing of the encryption keys and the initialization phase is simplified, the sending and receiving correspondents both perform the following: (a) agreeing on a set of elements $\{p_1, p_2, \ldots, p_L\}$ where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$, and wherein $p_{max} = \text{Max}(p_1, p_2, \ldots, p_L)$, where Max represents a maximum value operation, and $1_{max} = 1$ for $l=1, \ldots, L$, where $p_{max} = p_l$; and (b) agreeing on an upper limit for a number of bits to be used to represent a ciphertext.

The sending correspondent then performs the following: (c) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (d) forming the residue number system basis $\beta$ as $\{p_1, p_2, \ldots, p_L, q_1, q_2, \ldots, q_J\}$; (e) embedding message bit strings into L integer values $m_l$, where $l=1, \ldots, L$ and $1_{max} \neq 1$, such that $0 \leq m_l < p_l$ for $l=1, \ldots, L$; (f) selecting an integer $k \in Z_{p_{max}}$; (g) selecting an integer $g \in Z_{p_{max}}$, where it is preferable that $\sqrt{g} \notin Z_{p_{max}}$; (h) computing a value $g_{max}$ as $g_{max} = g^k \mod p_{max}$; (i) computing a set of integer cipher elements $c_l$ modulo $p_l$ as $c_l = m_l \cdot (g_{max}^{-1} \mod p_l) \mod p_l$ for $l=1, \ldots, L$; (j) setting $c_{l_{max}} = g_{max}$; (k) generating J random values $r_j$, where $j=1, \ldots, J$, such that $0 \leq r_j < q_j$ for $j=1, \ldots, J$; (l) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (m) converting the integer vector $\{c_1, c_2, \ldots, c_L, r_1, r_2, \ldots, r_J\}$ into an integer value C using the Chinese remainder theorem and the basis $\beta$; and (n) sending the integer value C to the receiving correspondent.

The receiving correspondent then performs the following: (o) generating the set of integer cipher elements $c_l$ using the set of elements $\{p_1, p_2, \ldots, p_L\}$ for $l=1, \ldots, L$ from the integer C as $c_l = C \mod p_l$; (p) setting $g_{max} = c_{l_{max}}$; (q) computing the value $g_{max}$ as $g_{max} = g^k \mod p_{max}$; (r) computing the message element values $m_l$ modulo $p_l$ as $m_l = c_l \cdot g_{max} \mod p_l$; and (s) recovering the message bit string from the element values $m_l$ for $l=1, \ldots, L$.

It should be noted that, in the above, the sending correspondent can change the key k and the value of g for each individual block being encrypted. Information about the encrypting key is then sent as part of the ciphertext. This is similar to the one time pad. It should be remembered that the security of this protocol is still based on blind integer factorization.

Example 14

In the following alternative embodiment, computation is reduced even further. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$ and, without loss of generality, the elements $\{p_1, p_2, \ldots, p_L\}$ are listed in decreasing value, and wherein $p_{max} = \text{Max}(p_1, p_2, \ldots, p_L)$, where Max represents a maximum value operation, where $p_{max} = p_l$ and $p_1$ and $p_2$ are chosen to be prime; and (b) agreeing on an upper limit for a number of bits to be used to represent a ciphertext.

The sending correspondent then performs the following: (c) selecting a set of elements $\{q_1, q_2, \ldots, q_J\}$ where J is an integer greater than zero and where the elements $\{q_1, q_2, \ldots, q_J\}$ relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (d) forming the residue number system basis $\beta$ as $\{p_1, p_2, \ldots, p_L, q_1, q_2, \ldots, q_J\}$; (e) embedding message bit strings into L integer values $m_l$, where $l=2, \ldots, L$, such that $0 \leq m_l < p_l$ for $l=2, \ldots, L$; (f) selecting an integer $k \in Z_{p_{max}}$; (g) selecting an integer $g \in Z_{p_{max}}$, where it is preferable that $\sqrt{g} \notin Z_{p_{max}}$; (h) computing a value $g_l$ as $g_l = g^k \mod p_l$; (i) computing a cipher element $c_2$ modulo $p_2$ as $c_2 = m_2 \cdot (g_1^{-1} \mod p_2) \mod p_2$; (j) computing a set of cipher elements $c_l$ modulo $p_l$ for $l=3, \ldots, L$ as $c_l = (m_l + m_{l-1}) \mod p_l$; (k) setting $c_l = g_l$; (l) generating J random values $r_j$, where $j=1, \ldots, J$, such that $0 \leq r_j < q_j$ for $j=1, \ldots, J$; (m) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (n) converting the integer vector $\{c_1, c_2, \ldots, c_L, r_1, r_2, \ldots, r_J\}$ into an integer value C using the Chinese remainder theorem and the basis $\beta$; and (o) sending the integer value C to the receiving correspondent.

The receiving correspondent then performs the following: (p) generating the set of integer cipher elements $c_l$ using the set of elements $\{p_1, p_2, \ldots, p_L\}$ for $l=1, \ldots, L$ from the integer C as $c_l = C \bmod p_l$; (q) setting $g_1 = c_1$; (r) computing the first message element value $m_2$ modulo $p_2$ as $m_2 = c_2 \cdot g_1 \bmod p_2$; (s) computing the message element values $m_l$ modulo $p_l$ for $l=3, \ldots, L-1$ as $m_l = (c_l - m_{l-1}) \bmod p_l$; and (t) recovering the message bit string from the element values $m_l$ for $l=2, \ldots, L$.

Example 15

It is often desirable that the encryption method used not only provide privacy or confidentiality of messages, but also authenticity. This property guarantees that the only feasible way to produce a valid ciphertext is to apply the encryption function to some message M, which requires knowledge of the secret information. In this case, the secret information is the RNS basis $\{p_1, p_2, \ldots, p_L\}$. This is shown in the following alternative embodiment:

The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ relatively prime with respect to one another and form a part of a shared secret, and which are further used as a residue number system basis $\beta$ given as $\beta = \{p_1, p_2, \ldots, p_L\}$; (b) agreeing on an integer $k_l \in Z_{p_l}$ for each element $p_l$, where $l=1, \ldots, L$, and where the elements $p_l$ form a part of the shared secret; (c) agreeing on an integer $g_l \in Z_{p_l}$ for each element $p_l$, where $l=1, \ldots, L$, such that $g_l^{-1} \bmod p_l$ exists, and where these integers may be part of the shared secret key or they may be made public and could be chosen such that $g_i = g_j$ for $i-1, \ldots, L$ and $j=1, \ldots, L$; and (d) agreeing on an upper limit for a number of bits to be used to represent a ciphertext.

The sending correspondent then performs the following: (e) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (f) forming the residue number system basis $\beta$ as $\{p_1, p_2, \ldots, p_L, q_1, q_2, \ldots, q_J\}$; (g) embedding message bit strings into L-1 integer values $m_l$, where $l=1, \ldots, L$, such that $0 \leq m_l < p_l$ for $l=1, \ldots, L$ using a parity check embedding method; (h) computing a value $m_L$ as $$m_L = \left(\sum_{l=1}^{L-1} m_l\right) \bmod p_L;$$

(i) computing a set of integer cipher elements $c_l$ modulo $p_l$ as $c_l = m_l \cdot (g_l^{-1})^{k_l} \bmod p_l$ for $l=1, \ldots, L$; (j) generating J random values $r_j$, where $j=1, \ldots, J$, such that $0 \leq r_j < q_j$ for $j=1, \ldots, J$; (k) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (l) converting the integer vector $\{c_1, c_2, \ldots, c_L, r_1, r_2, \ldots, r_J\}$ into an integer value C using the Chinese remainder theorem and the basis $\beta$; and (m) sending the integer value C to the receiving correspondent.

The receiving correspondent then performs the following: (n) generating the set of integer cipher elements $c_l$ using the set of elements $\{p_1, p_2, \ldots, p_L\}$ for $l=1, \ldots, L$ from the integer C as $c_l = C \bmod p_l$; (o) computing the message element values $m_l$ modulo $p_l$ as $m_l = c_l \cdot g_l^{k_l}$; (p) recovering the message bit strings and the corresponding parity bits from the element values $m_l$ for $l=1, \ldots, L$; (q) generating party check bits from the recovered message bit strings and computing the value $m'_L$ as $$m'_L = \left(\sum_{l=1}^{L-1} m_l\right) \bmod p_L;$$

and (r) checking if the generated parity check bits and parity bits recovered from the element values $m_l$ for $l=1, \ldots, L$ are equal, and if $m'_L = m_L$, then authenticating the decrypted message.

It should be noted that the above approach to authenticity can be applied to any of Examples 11-14 described above.

Example 16

In the further alternative embodiment given below, the term "gcd" represents the greatest common divisor operation. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; (b) agreeing on an integer $e_l \in Z_{p_l}$ for each element $p_l$, where $l=1, \ldots, L$, such that $\gcd(e_l(p_l - 1)) = 1$, and where the elements $e_l$ form a part of the shared secret key; and (c) agreeing on an upper limit for a number of bits to be used to represent a ciphertext.

The sending correspondent then performs the following: (d) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (e) forming the residue number system basis $\beta$ as $\{p_1, p_2, \ldots, p_L, q_1, q_2, \ldots, q_J\}$; (f) computing an integer $d_l$ for each element $p_l$ for $l=1, \ldots, L$, such that $e_l d_l \bmod p_l=1$; (g) embedding message bit strings into L integer values $m_l$, where $l=1, \ldots, L$, such that $0 \leq m_l < p_l$ for $l=1, \ldots, L$; (h) computing a set of integer cipher elements $c_l$ modulo $p_l$ as $c_l = m_l^{d_i} \bmod p_l$ for $l=1, \ldots, L$; (i) generating J random values $r_j$, where $j=1, \ldots, J$, such that $0 \leq r_j < q_j$ for $j=1, \ldots, J$; (j) combining the set of integer cipher element values $c_l$ for $l=1 \ldots, L$ and the values $r_j$ for $j=1, \ldots, J$ to form a single integer vector $\{c_1, c_2, \ldots, c_L, r_1, r_2, \ldots, r_J\}$; (k) converting the integer vector $\{c_1, c_2, \ldots, c_L, r_1, r_2, \ldots, r_J\}$ into an integer value C using the Chinese remainder theorem and the basis $\beta$; and (l) sending the integer value C to the receiving corresponding.

The receiving correspondent then performs the following: (m) generating the set of integer cipher elements $c_l$ using the set of elements $\{p_1, p_2, \ldots, p_L\}$ for $l=1, \ldots, L$ from the integer C as $c_l = C \bmod p_l$; (n) computing the message element values $m_l$ modulo $p_l$ as $m_l = c_l^{e_i} \bmod p_l$; and (o) recovering the message bit strings from the element values $m_l$ for $l=1, \ldots, L$.

Example 17

An additional alternative embodiment includes the following steps. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; and (b) agreeing on an upper limit for a number of bits to be used to represent a ciphertext.

The sending correspondent then performs the following: (c) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (d) forming the residue number system basis $\beta$ as $\{p_1, p_2, \ldots, p_L, q_1, q_2, \ldots, q_J\}$; (e) selecting an integer $e_l \in Z_{p_l}$ for each element $p_l$, where $l=1, \ldots, L$, such that $\gcd(e_l(p_l-1))=1$, and where the integer values $e_l$ are made public; (f) embedding message bit strings into L integer values $m_l$, where $l=1, \ldots, L$, such that $0 \leq m_l < p_l$ for $l=1, \ldots, L$; (g) computing a set of integer cipher elements $c_l$ modulo $p_l$ as $c_l = m_l^{e_i} \bmod p_l$ for $l=1, \ldots, L$; (h) generating J random values $r_j$, where $j=1, \ldots, J$, such that $0 \leq r_j < q_j$ for $j=1, \ldots, J$; (i) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (j) converting the integer vector $\{c_1, c_2, \ldots, c_L, r_1, r_2, \ldots, r_J\}$ into an integer value C using the Chinese remainder theorem and the basis $\beta$; and (k) sending the integer value C to the receiving correspondent.

The receiving correspondent then performs the following: (l) generating the set of integer cipher elements $c_l$ using the set of elements $\{p_1, p_2, \ldots, p_L\}$ for $l=1, \ldots, L$ from the integer C as $c_l = C \bmod p_l$; (m) computing an integer $d_l$ for each element $p_l$ for $l=1, \ldots, L$, such that $e_l d_l \bmod p_l = 1$; (n) computing the message element values $m_l$ modulo $p_l$ as $m_l = c_l^{d_i} \bmod p_l$; and (o) recovering the message bit strings from the element values $m_l$ for $l=1, \ldots, L$.

In the above, the advantage of making public is that the sending correspondent can change the key unilaterally without the need for a prior agreement with the receiving correspondent. Additionally, minimal information is leaked about the primes $p_l$ by the public information about the integers $e_l$ for $l=1, \ldots, L$ by the fact that $\gcd(e_l(p_l-1))=1$, since many prime numbers can satisfy this condition.

Example 18

In the following alternative embodiment, redundant representation is utilized to reduce any leaking information which may occur by the public information regarding the integers $e_l$ for $l=1, \ldots, L$, by the fact that $\gcd(e_l(p_l-1))=1$:

The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; and (b) agreeing on an upper limit for a number of bits to be used to represent a ciphertext.

The sending correspondent then performs the following: (c) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (d) forming the residue number system basis $\beta$ as $\{p_1, p_2, \ldots, p_L, q_1, q_2, \ldots, q_J\}$; (e) selecting an integer $e_l \in Z_{p_l}$ for each element $p_l$, where $l=1, \ldots, L$, such that $\gcd(e_l(p_l-1))=1$; (f) computing a set of integer values $e'_l$ as $e'_l = e_l + sp_l$ for $l=1, \ldots, L$, wherein the integer values $e'_l$ are made public; (g) embedding message bit strings into L integer values $m_l$, where $l=1, \ldots, L$, such that $0 \leq m_l < p_l$ for $l=1, \ldots, L$; (h) computing a set of integer cipher elements $c_l$ modulo $p_l$ as $c_l = m_l^{e_i} \bmod p_l$ for $l=1, \ldots, L$; (i) generating J random values $r_j$ where $j=1, \ldots, J$, such that $0 \leq r_j < q_j$ for $j=1, \ldots, J$; (j) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (k) converting the integer vector $\{c_1, c_2, \ldots, c_L, r_1, r_2, \ldots, r_J\}$ into an integer value C using the Chinese remainder theorem and the basis $\beta$; and (l) sending the integer value C to the receiving correspondent.

The receiving correspondent then performs the following: (m) generating the set of integer cipher elements c; using the set of elements $\{p_1, p_2, \ldots, p_L\}$ for $l=1, \ldots, L$ from the integer C as $c_l = C \bmod p_l$; (n) computing the integer values $e'_l$ as $e_l = e'_l \bmod p_l$ for $l \geq 1, \ldots, L$; (o) computing an integer $d_l$ for each element $p_l$ for $l=1, \ldots, L$, such that $e_l d_l \bmod p_l = 1$; (p) computing the message element values $m_l$ modulo $p_l$ as $m_l = c_l^{d_l} \mod p_l$; and (q) recovering the message bit strings from the element values $m_l$ for $l=1, \ldots, L$.

In the above, the use of redundant information adds additional uncertainty about the true values of $e_l$ for $l=1, \ldots, L$ and, thus, adds uncertainty on any useful information that might be inferred from the public integers $e_l$ for $l=1, \ldots, L$.

Example 19

In the following further alternative embodiment, one exponentiation key is used to reduce the number computations.

The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; and (b) agreeing on an upper limit for a number of bits to be used to represent a ciphertext.

The sending correspondent then performs the following: (c) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (d) forming the residue number system basis $\beta$ as $\{p_1, p_2, \ldots, p_L, q_1, q_2, \ldots, q_J\}$; (e) selecting an integer $e_l \in Z_{p_l}$ for each element $p_l$, where $l=1, \ldots, L$, such that $\gcd(e_l(p_l-1))=1$, and where the integer values $e_l$ are made public; (f) embedding message bit strings into L integer values $m_l$, where $l=1, \ldots, L$, such that $0 \leq m_l < p_l$ for $l=1, \ldots, L$; (g) computing a first integer cipher element $c_l$ modulo $p_l$ as $c_l = m_l^{e_l} \mod p_l$; (h) computing a set of integer cipher elements $c_l$ modulo $p_l$ as $c_l = (m_l + m_{l-1}) \mod p_l$ for $l=2, \ldots, L$; (i) generating J random values $r_j$, where $j=1, \ldots, J$, such that $0 \leq r_j < q_j$ for $j=1, \ldots, J$; (j) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (k) converting the integer vector $\{c_1, c_2, \ldots, c_L, r_1, r_2, \ldots, r_J\}$ into an integer value C using the Chinese remainder theorem and the basis $\beta$; and (l) sending the integer value C to the receiving correspondent.

The receiving correspondent then performs the following: (m) generating the set of integer cipher elements $c_l$ using the set of elements $\{p_1, p_2, \ldots, p_L\}$ for $l=1, \ldots, L$ from the integer C as $c_l = C \mod p_l$; (n) computing an integer $d_l$ for each element $p_l$ for $l=1, \ldots, L$, such that $e_l d_l \mod p_l = 1$; (o) computing a first message element value $m_l$ modulo $p_l$ as $m_l = c_l^{d_l} \mod p_l$; (p) computing the message element values $m_l$ modulo $p_l$ as $m_l = (c_l - m_{l-1}) \mod p_l$ for $l=2, \ldots, L$; and (q) recovering the message bit strings from the element values $m_l$ for $l=1, \ldots, L$.

Example 20

It is often desirable that the encryption method used not only provide privacy or confidentiality of messages, but also authenticity. This property guarantees that the only feasible way to produce a valid ciphertext is to apply the encryption function to some message M, which requires knowledge of the secret information. In this case, the secret information is the RNS basis $\{p_1, p_2, \ldots, p_L\}$. This is shown in the following alternative embodiment:

The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis $\beta$ given as $\beta = \{p_1, p_2, \ldots, p_L\}$; (b) agreeing on an integer $e_l \in Z_{p_l}$ for each element $p_l$, where $l=1, \ldots, L$, such that $\gcd(e_l(p_l-1))=1$, and where the elements $e_l$ form a part of the shared secret key; and (c) agreeing on an upper limit for a number of bits to be used to represent a ciphertext.

The sending correspondent then performs the following: (d) selecting a set of elements $\{q_1, q_2, \ldots, q_J\}$ where J is an integer greater than zero and where the elements $\{q_1, q_2, \ldots, q_J\}$ are relatively prime with respect to one another and which are also relatively prime with respect to the elements $\{p_1, p_2, \ldots, p_L\}$, the set $\{q_1, q_2, \ldots, q_J\}$ being known to the sending correspondent only and the number of bits needed to represent the value of $$\prod_{l=1}^{L} p_l \prod_{j=1}^{J} q_j$$

are within the upper limit for the number of bits used to represent the ciphertext agreed upon by the sending and receiving correspondents; (e) forming the residue number system basis $\beta$ as $\{p_1, p_2, \ldots, p_L, q_1, q_2, \ldots, q_J\}$; (f) computing an integer $d_l$ for each element $p_l$ for $l=1, \ldots, L$, such that $e_l d_l \mod p_l = 1$; (g) embedding message bit strings into L−1 integer values $m_l$, where $l=1, \ldots, L$, such that $0 \leq m_l < p_l$ for $l=1, \ldots, L$ using a parity check embedding method; (h) computing a value $m_L$ as $$m_L = \left(\sum_{l=1}^{L-1} m_l\right) \mod p_L;$$

(i) computing a set of integer cipher elements $c_l$ modulo $p_l$ as $c_l = m_l^{d_l} \mod p_l$ for $l=1, \ldots, L$; (j) generating J random values $r_j$, where $j=1, \ldots, J$, such that $0 \leq r_j < q_j$ for $j=1, \ldots, J$; (k) combining the set of integer cipher element values $c_l$ for $l=1, \ldots, L$ and the values $r_j$ for $j=1, \ldots, J$ to form a single integer vector $\{c_1, c_2, \ldots, c_L, r_1, r_2, \ldots, r_J\}$; (l) converting the integer vector $\{c_1, c_2, \ldots, c_L, r_1, r_2, \ldots, r_J\}$ into an integer value C using the Chinese remainder theorem and the basis $\beta$; and (m) sending the integer value C to the receiving correspondent.

The receiving correspondent then performs the following: (n) generating the set of integer cipher elements $c_l$ using the set of elements $\{p_1, p_2, \ldots, p_L\}$ for $l=1, \ldots, L$ from the integer C as $c_l = C \mod p_l$; (o) computing the message element values $m_l$ modulo $p_l$ as $m_l = c_l^{e_l} \mod p_l$; (p) recovering the message bit strings and the corresponding parity bits from the element values $m_l$ for $l=1, \ldots, L$; (q) generating party check bits from the recovered message bit strings and computing the value $m_L$ as $$m'_L = \left(\sum_{l=1}^{L-1} m_l\right) \bmod p_L;$$

and (r) checking if the generated parity check bits and parity bits recovered from the element values $m_l$ for $l=1, \ldots, L$ are equal, and if $m'_L = m_L$, then authenticating the decrypted message.

It should be noted that the above approach to authenticity can be applied to any of Examples 16-19 described above.

There are many ways of encrypting data streams that are longer than a single block into a block cipher. The conventional approach is to divide the data stream into a sequence of blocks of the same size as the block cipher. Two commonly used modes of operation employing standard ways (modes) of operation employing digital electronic signatures are the Electronic Code Book (ECB) and Cipher Block Chaining (CBC). For ECB, the encryption of one block must be independent of the data in the previous block. In CBC, each block of cipher is chained to the preceding block of cipher.

When sending block ciphers using either Electronic Code Book (ECB) or Cipher Block Chaining, RNS basis hopping may be used for protection against collision attacks, such as birthdays attacks, which are sometimes effective when the same plaintext is encrypted into the same ciphertext. The RNS basis hopping may be used on the encryption basis, on the blind randomization basis, or both. In RNS hopping on the encryption basis, for each block of ciphertext, the sending correspond selects a subset of the basis that will be used to encrypt the plaintext message, and inserts a code in an agreed message element that advises the receiving correspondent which elements are used for encryption in the block, and which elements are not. In RNS hopping on the blind randomization basis, the sending correspondent uses a random subset of the elements of the second RNS (used to generate random elements to pad the cipher elements) for each block in the cipher. RNS basis hopping is illustrated in the following Examples 21-29. In the following, it is assumed that the maximum block size that can be embedded into the L residue values $\{m_1, m_2, \ldots, m_L\}$ is N, and that the message data bit string length is a multiple of N, such as $(u+1)N$. In other words, the number of blocks is $(u+1)$.

Example 21

The following alternative embodiment utilizes hopping of the encryption basis. The sending and receiving correspondents both perform the following: (a) agreeing on a set of elements $\{p'_1, p'_2, \ldots, p'_{L'}\}$, where L' is an integer greater than or equal to one, where the elements $\{p'_1, p'_2, \ldots, p'_{L'}\}$ are relatively prime with respect to one another and form a part of a shared secret; (b) agreeing on an integer $k'_l \in Z_{p'_l}$ for each element $p'_l$, where $l=1, \ldots, L'$, where each $k_l$ forms a part of the shared secret; (c) agreeing on an integer $g'_l \in Z_{p'_l}$ for each element $p'_l$, where $l=1, \ldots, L'$, such that $g'_l{}^{-1} \bmod p'_l$ exists, such that the integers $g'_l$ could be part of the shared secret key or could be made public. The integers $g'_l$ may also be chosen such that $g'_i = g'_j$ for $i=1, \ldots, L'$ and $j=1, \ldots, L'$; (d) agreeing on a list of codes where each code identifies a different sub set of $(L'-1)$ elements out of the set of L' shared secret elements; (e) agreeing on an element $p_L$ of the set $\{p'_1, p'_2, \ldots, p'_{L'}\}$ that is used to carry information about the code used by the sending correspondent to select a subset of elements $\{p'_1, p'_2, \ldots, p'_{L'}\}$ that are used to form the RNS-basis and where the number of codes is $(p_L - 1)$; and (f) agreeing on an upper limit for a number of bits to be used to represent a ciphertext.

The sending correspondent then performs the following, starting with $i=0$ and repeating steps (g) through (l) to encrypt the i-th block until $i>u$: (g) selecting a code from the list of codes agreed upon to select $(L-1)$ elements $\{p_{i,1}, p_{i,2}, \ldots p_{i,L-1}\}$ from the elements $\{p'_1, p'_2, \ldots, p'_{L'}\}$ to form an RNS basis $\beta = \{p_{i,1}, p_{i,2}, \ldots p_{i,L-1}\}$ for the i-th block, where $p_{i,L} = p_L$; (h) embedding message bit strings into $(L-1)$ integer values $m_{i,l}$, where $l=1, \ldots, L-1$, such that $0 \leq m_{i,l} < p_l$ for $l=1, \ldots, L-1$; (i) computing a set of integer cipher elements $c_{i,l}$ modulo $p_{i,l}$ as $c_{i,l} = m_{i,l} \cdot (g_{i,l}^{-1})^{k_l} \bmod p_{i,l}$ for $l=1, \ldots, L$; (j) combining the set of integer cipher element values $c_{i,l}$ for $l=1, \ldots, L$ to form a single integer vector $\{c_{i,1}, c_{i,2}, \ldots c_{i,L}\}$; (k) converting the integer vector $\{c_{i,1}, c_{i,2}, \ldots c_{i,L}\}$ into an integer value $C_i$ using the Chinese remainder theorem and the basis $\beta$; and (l) sending the integer value $C_i$ to the receiving correspondent.

The receiving correspondent then performs the following, starting with $i=0$ and repeating steps (m) through (r) to encrypt the i-th block until $i>u$: (m) generating the integer cipher element $c_{i,L}$ using the element $p_{i,L}$ from the integer $C_i$ as $c_{i,L} = C_i \bmod p_{i,L}$; (n) computing the message element values $m_{i,L}$ modulo $p_{i,L}$ as $m_{i,L} = c_{i,L} \cdot g_{i,L}{}^{k_L} \bmod p_{i,L}$; (o) recovering the message bit string from the element value $m_{i,L}$; (p) generating the set of integer cipher elements $c_{i,l}$ using the set of elements $\{p_{i,1}, p_{i,2}, \ldots p_{i,L-1}\}$ for $l=1, \ldots, L-1$ from the integer $C_i$ as $c_{i,l} = C_i \bmod p_{i,l}$ for $l=1, \ldots, L$; (q) computing the message element values $m_{i,l}$ modulo $p_{i,l}$ as $m_{i,l} = c_{i,l} \cdot g_{i,l}{}^{k_l} \bmod p_{i,l}$ for $l=1, \ldots, L-1$; and (r) recovering the message bit string from the element values $m_{i,l}$ for $l=1, \ldots, L-1$.

It should be noted that since the same bit string can be encrypted using different encryption bases in this protocol, the occurrence of collisions that are exploited in birthday attacks is minimized even further. Further, there is no need to synchronize basis selection between the sending and receiving correspondent. The information about which basis is used by the sending correspondent is sent with the cipher text. The alternative is to have identical code generation circuits at the sending and receiving correspondent which must be initialized to the same starting point. This has the drawback of requiring additional circuitry at the receiving correspondent. The above protocol circumvents the need for such circuits and for synchronization. Additionally, if $t_i$ and $t_j$ are relatively prime to each other, then so are $t_i{}^n$ and $t_j{}^m$. If $t_i$, $t_j$ and $t_l$ are relatively prime to each other, then so are $(t_i t_j)$ and $t_l$. This can be exploited to generate more relatively prime sets from an agreed upon relatively prime set.

Example 22

The following alternative embodiment illustrates hopping of the blind randomization basis. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis P given as $\beta = \{p_1, p_2, \ldots, p_L\}$; (b) agreeing on an integer $k_l \in Z_{p_l}$ for each element $p_l$, where $l=1, \ldots, L$, where each $k_l$ forms a part of the shared secret; (c) agreeing on an integer $g_l \in Z_{p_l}$ for each element $p_l$, where $l=1, \ldots, L$, such that $g_l^{-1} \bmod p_l$ exists, such that the integers $g_l$ could be part of the shared secret key or could be made public. The integers $g_l$ may also be chosen such that $g_i = g_j$ for $i=1, \ldots, L$ and $j=1, \ldots, L$; and (d) agreeing on an upper limit for a number of bits to be used to represent a ciphertext.

The sending correspondent then performs the following: (e) selecting a set of elements $\{q'_1, q'_2, \ldots, q'_{J'}\}$ where J' is an integer greater than zero and where the elements $\{q'_1, q'_2, \ldots, q'_{J'}\}$ are relatively prime with respect to one another and which are also relatively prime with respect to the elements $\{p_1, p_2, \ldots, p_L\}$, the set $\{q'_1, q'_2, \ldots, q'_{J'}\}$ being known to the sending correspondent only; starting with i=0, then repeating steps (f) through (m) to encrypt the i-th block until i>u: (f) randomly selecting a sub-set of elements $\{q_{i,1}, q_{i,2}, \ldots, q_{i,J}\}$ from the $\{q'_1, q'_2, \ldots, q'_{J'}\}$ where the number of bits needed to represent $$\prod_{l=1}^{L} p_l \prod_{j=1}^{J} q_j$$

is within the upper limit agreed upon by the sending and receiving correspondents; (g) forming the residue number system basis β as $\{p_{i,1}, p_{i,2}, \ldots, p_{i,L}, q_{i,1}, q_{i,2}, \ldots, q_{i,J}\}$; (n) embedding message bit strings into L integer values $m_{i,l}$, where l=1, ..., L, such that $0 \leq m_{i,l} < p_l$ for l=1, ..., L; (i) computing a set of integer cipher elements $c_{i,l}$ modulo $p_l$ as $c_{i,l} = m_{i,l} \cdot (g_{i,l}^{-1})^{k_l} \mod p_{i,l}$ for l=1, ..., L; (j) generating J random values $r_{i,j}$, where j=1, ..., J for the i-th block, such that $0 \leq r_j < q_j$ for j=1, ..., J; (k) combining the set of integer cipher element values $c_{i,l}$ for l=1, ..., L and the values $r_{i,j}$ for j=1, ..., J to form a single integer vector $\{c_{i,1}, c_{i,2}, \ldots, c_{i,L}, r_{i,1}, r_{i,2}, \ldots, r_{i,J}\}$; (l) converting the integer vector $\{c_{i,1}, c_{i,2}, \ldots, c_{i,L}, r_{i,1}, r_{i,2}, \ldots, r_{i,J}\}$ into an integer value $C_i$ using the Chinese remainder theorem and the basis β; and (m) sending the integer value C to the receiving correspondent.

The receiving correspondent then performs the following: starting with i=0, then repeating steps (n) through (p) until i>u: (n) generating the set of integer cipher elements $c_{i,l}$ using the set of elements $\{p_1, p_2, \ldots, p_L\}$ for l=1, ..., L from the integer $C_i$ as $c_{i,l} = C_i \mod p_{i,l}$; (o) computing the message element values $m_{i,l}$ modulo $p_{i,l}$ as $m_{i,l} = c_{i,l} \cdot g_{i,l}^{k_l} \mod p_{i,l}$; and (p) recovering the message bit string of the i-th block from the element values $m_{i,l}$ for l=1, ..., L.

It should be noted that hopping the basis of blind randomization will reduce even further the occurrence of collisions that are exploited in birthday attacks, since likelihood that the same message bit string will be coded into two different ciphertexts is much higher, given that two different randomizing bases and/or two different vectors of random numbers $\{r_1, r_2, \ldots, r_J\}$ could be used. Additionally, if $t_i$ and $t_j$ are relatively prime to each other, then so are $t_i^n$ and $t_j^m$. If $t_i$ and $t_j$ are relatively prime to each other, then so are $(t_i t_j)$ and $t_j$. This can be exploited to generate more relatively prime sets from an agreed upon relatively prime set.

Example 23

The following alternative embodiment utilizes both hopping of the encryption basis and hopping of the blind randomization basis:

The sending and receiving correspondents both perform the following: (a) agreeing on a set of elements $\{p'_1, p'_2, \ldots, p'_{L'}\}$, where L' is an integer greater than or equal to one, where the elements $\{p'_1, p'_2, \ldots, p'_{L'}\}$ are relatively prime with respect to one another and form a part of a shared secret; (b) agreeing on an integer $k'_l \in Z_{p'_l}$ for each element $p'_l$, where l=1, ..., L', where each $k_l$ forms a part of the shared secret; (c) agreeing on an integer $g'_l \in Z_{p'_l}$ for each element $p'_l$, where l=1, ..., L', such that $g'_l^{-1} \mod p'_l$ exists, such that the integers $g'_l$ could be part of the shared secret key or could be made public. The integers $g'_l$ may also be chosen such that $g'_i = g'_j$ for i=1, ..., L' and j=1, ..., L'; (d) agreeing on a list of codes where each code identifies a different sub set of (L'-1) elements out of the set of L' shared secret elements; (e) agreeing on an element $p_L$ of the set $\{p'_1, p'_2, \ldots, p'_{L'}\}$ mal is used to carry information about the code used by the sending correspondent to select a sub-set of elements $\{p'_1, p'_2, \ldots, p'_{L'}\}$ that are used to form the RNS-basis and where the number of codes is $(p_L-1)$; and (f) agreeing on an upper limit for a number of bits to be used to represent a ciphertext.

The sending correspondent then performs the following: (g) selecting a set of elements $\{q'_1, q'_2, \ldots, q'_{J'}\}$ where J' is an integer greater than zero and where the elements $\{q'_1, q'_2, \ldots, q'_{J'}\}$ are relatively prime with respect to one another and which are also relatively prime with respect to the elements $\{p_1, p_2, \ldots, p_L\}$, the set $\{q'_1, q'_2, \ldots, q'_{J'}\}$ being known to the sending correspondent only; starting with i=0, repeating steps (h) through (q) to encrypt the i-th block until i>u: (h) selecting a code from the list of codes agreed upon to select (L-1) elements $\{p_{i,1}, p_{i,2}, \ldots, p_{i,L-1}\}$ from the elements $\{p'_1, p'_2, \ldots, p'_{L'}\}$; (i) randomly selecting a sub-set of elements $\{q_{i,1}, q_{i,2}, \ldots, q_{i,J}\}$ from the set $\{q'_1, q'_2, \ldots, q'_{J'}\}$, where the number of bits needed to represent $$\prod_{l=1}^{L} p_l \prod_{j=1}^{J} q_j$$

is within the upper limit agreed upon by the sending and receiving correspondents; (j) forming the residue number system basis β as $\{p_{i,1}, p_{i,2}, \ldots, p_{i,L}, q_{i,1}, q_{i,2}, \ldots, q_{i,J}\}$; (k) embedding message bit strings into (L-1) integer values $m_{i,l}$, where l=1, ..., L-1, such that $0 \leq m_{i,l} < p_l$ for l=1, ..., L-1; (l) embedding message bit strings of the code used by the sending correspondent to select the (L-1) elements $\{p_{i,1}, p_{i,2}, \ldots, p_{i,L-1}\}$ for the i-th block into the integer values $m_{i,l}$, such that $0 \leq m_{i,l} < p_L$; (m) computing a set of integer cipher elements $c_{i,l}$ modulo $p_{i,l}$ as $c_{i,l} = m_{i,l} \cdot (g_{i,l}^{-1})^{k_l} \mod p_{i,l}$ for l=1, ..., L; (n) generating J random values $r_{i,j}$, where j=1, ..., J for the i-th block, such that $0 \leq r_j < q_j$ for j=1, ..., J; (o) combining the set of integer cipher element values $\{c_{i,1}, c_{i,2}, \ldots, c_{i,L}, r_{i,1}, r_{i,2}, \ldots, r_{i,J}\}$; for l=1, ..., L and the values $r_{i,j}$ for j=1, ..., J to form a single integer vector $\{c_{i,1}, c_{i,2}, \ldots, c_{i,L}, r_{i,1}, r_{i,2}, \ldots, r_{i,J}\}$; (p) converting the integer vector $\{c_{i,1}, c_{i,2}, \ldots, c_{i,L}, r_{i,1}, r_{i,2}, \ldots, r_{i,J}\}$ into an integer value $C_i$ using the Chinese remainder theorem and the basis β; and (q) sending the integer value $C_i$ to the receiving correspondent.

The receiving correspondent then performs the following, starting with i=0 and repeating steps (r) through (w) to encrypt the i-th block until i>u: (r) generating the integer cipher element $c_{i,L}$ modulo $p_{i,L}$ from the integer $C_i$ as $c_{i,L} = C_i \mod p_{i,L}$; (s) computing the message element values $m_{i,L}$ modulo $p_{i,L}$ as $m_{i,L} = c_{i,L} \cdot g_{i,L}^{k_L} \mod p_{i,L}$; (t) recovering the message bit string used define the set $\{p_{i,1}, p_{i,2}, \ldots, p_{i,L-1}\}$ from the element value $m_{i,L}$; (u) generating the set of integer cipher elements $c_{i,l}$ using the set of elements $\{p_{i,1}, p_{i,2}, \ldots, p_{i,L-1}\}$ for l=1, ..., L-1 from the integer $C_i$ as $c_{i,L} = C_i \mod p_{i,L}$ for l=1, ..., L-1; (v) computing the message element values $m_{i,l}$ modulo $p_{i,L}$ as $m_{i,l} = c_{i,l} \cdot g_{i,l}^{k_l} \mod p_{i,L}$ for l=1, ..., L-1; and (w) recovering the message bit string of the i-th block from the element values $m_{i,l}$ for l=1, ..., L-1.

In the above, it should be noted that reduction of the likelihood of occurrence of collision is due to a combination of the random selection of the set $\{p_{i,1}, p_{i,2}, \ldots, p_{i,L}\}$, which could be different for each message block, and the random selection of the set $\{q_{i,1}, q_{i,2}, \ldots, q_{i,J}\}$, which is different for each message block.

Example 24

The following alternative embodiment utilizes ECB and hopping of the encryption basis.

The sending and receiving correspondents both perform the following: (a) agreeing on a set of elements $\{p'_1, p'_2, \ldots, p'_{L'}\}$, where $L'$ is an integer greater than or equal to one, where the elements $\{p'_1, p'_2, \ldots, p'_{L'}\}$ are relatively prime with respect to one another and form a part of a shared secret; (b) agreeing on an integer et $e'_l \epsilon Z_{p_l}$ for each element $p'_l$, where $l=1, \ldots, L$, such that $\gcd(e'_l, (p'_l-1))=1$, and where the elements $e'_l$ form a part of the shared secret key; (c) agreeing on a list of codes where each code identifies a different sub set of $(L-1)$ elements out of the set of $L'$ shared secret elements; (d) agreeing on an element $p_L$ of the set $\{p'_1, p'_2, \ldots, p'_{L'}\}$ that is used to carry information about the code used by the sending correspondent to select a sub-set of elements $\{p'_1, p'_2, \ldots, p'_{L'}\}$ that are used to form the RNS-basis and where the number of codes is $(p_L-1)$; and (e) agreeing on an upper limit for a number of bits to be used to represent a ciphertext.

The sending correspondent then performs the following: (f) computing an integer $d'_l$ for each element $p'_l$, where $l=1, \ldots, L$, such that $e'_l d'_l \bmod p_l = 1$; starting with $i=0$, repeating steps (g) through (m) to encrypt the i-th block until $i>u$; (g) selecting a code from the list of codes agreed upon to select $(L-1)$ elements $\{p_{i,1}, p_{i,2}, \ldots, p_{i,L-1}\}$ from me elements $\{p'_1, p'_2, \ldots, p'_{L'}\}$ to form the residue number system basis β as $\{p_{i,1}, p_{i,2}, \ldots, p_{i,L}, p_{i,L}\}$ for the i-th block, where $p_{i,L}=p_L$; (h) embedding message bit strings into $(L-1)$ integer values $m_{i,l}$, where $l=1, \ldots, L-1$, such that $0 \leq m_{i,l} < p_l$ for $l=1, \ldots, L-1$; (i) embedding message bit strings of the code used by the sending correspondent to select the $(L-1)$ elements $\{p_{i,1}, p_{i,2}, \ldots, p_{i,L-1}\}$ for the i-th block into the integer values $m_{i,L}$, such that $0 \leq m_{i,L} < p_L$; (j) computing a set of integer cipher elements $c_{i,l}$ modulo $p_{i,l}$ as $c_{i,l}=m_{i,l}^{d_{i,l}} \bmod p_{i,l}$ for $l=1, \ldots, L$; (k) combining the set of integer cipher element values $c_{i,l}$ for $l=1, \ldots, L$ to form a single integer vector $\{c_{i,1}, c_{i,2}, \ldots, c_{i,L}\}$; (l) converting the integer vector $\{c_{i,1}, c_{i,2}, \ldots, c_{i,L}\}$ into an integer value $C_i$ using the Chinese remainder theorem and the basis β; and (m) sending the integer value $C_i$ to the receiving correspondent.

The receiving correspondent then performs the following, starting with $i=0$ and repeating steps (n) through (s) to encrypt the i-th block until $i>u$: (n) generating the integer cipher element $c_{i,L}$ modulo $p_{i,L}$ from the integer $C_i$ as $c_{i,L}=C_i \bmod p_{i,L}$; (o) computing the message element values $m_{i,L}$ modulo $m_{i,L}=c_{i,L}^{e_{i,L}} \bmod p_{i,L}$; (p) recovering the code used define the set $\{p_{i,1}, p_{i,2}, \ldots, p_{i,L-1}\}$ from the element value $m_{i,L}$; (q) generating the set of integer cipher elements $c_{i,l}$ using the set of elements $\{p_{i,1}, p_{i,2}, \ldots, p_{i,L-1}\}$ for $l=1, \ldots, L-1$ from the integer $C_i$ as $c_{i,L}=C_i \bmod p_{i,L}$ for $l=1, \ldots, L-1$; (r) computing the message element values $m_{i,l}$ modulo $p_{i,l}$ as $m_{i,l}=c_{i,l}^{e_{i,l}} \bmod p_{i,l}$ for $l=1, \ldots, L-1$; and (s) recovering the message bit string of the i-th block from the element values $m_{i,l}$ for $l=1, \ldots, L-1$.

Example 25

The following alternative embodiment utilizes ECB and hopping of the blind randomization basis, the sending and receiving correspondents both perform the following: (a) agreeing on a set of elements $\{p_1, p_2, \ldots, p_L\}$, where $L$ is an integer greater than or equal to one, where the elements $\{p_1, p_2, \ldots, p_L\}$ are relatively prime with respect to one another and form a part of a shared secret, and which are further used as a residue number system basis β given as $\beta = \{p_1, p_2, \ldots, p_L\}$; (b) agreeing on an integer $e_l \epsilon Z_{p_l}$ for each element $p_l$, where $l=1, \ldots, L$, such that $\gcd(e_l, (p_l-1))=1$, and where the elements $e_l$ form a part of the shared secret key; and (c) agreeing on an upper limit for a number of bits to be used to represent a ciphertext.

The sending correspondent then performs the following: (d) selecting a set of elements $\{q'_1, q'_2, \ldots, q'_{J'}\}$ where $J'$ is an integer greater than zero and where the elements $\{q'_1, q'_2, \ldots, q'_{J'}\}$ are relatively prime with respect to one another and which are also relatively prime with respect to the elements $\{p_1, p_2, \ldots, p_L\}$, the set $\{q'_1, q'_2, \ldots, q'_{J'}\}$ being known to the sending correspondent only; starting with $i=0$, repeating steps (e) through (l) to encrypt the i-th block until $i>u$: (e) randomly selecting a sub-set of elements $\{q_{i,1}, q_{i,2}, \ldots, q_{i,J}\}$ from the set $\{q'_1, q'_2, \ldots, q'_{J'}\}$, where the number of bits needed to represent $$\prod_{l=1}^{L} p_l \prod_{j=1}^{J} q_j$$

is within the upper limit agreed upon by the sending and receiving correspondents; (f) forming the residue number system basis β as $\{p_{i,1}, p_{i,2}, \ldots, p_{i,L}, q_{i,1}, q_{i,2}, \ldots, q_{i,J}\}$; (g) embedding message bit strings into $L$ integer values $m_{i,l}$, where $l=1, \ldots, L$, such that $0 \leq m_{i,l} < p_l$ for $l=1, \ldots, L$; (h) computing a set of integer cipher elements $c_{i,l}$ modulo $p_{i,l}$ as $c_{i,l}=m_{i,l}^{d_{i,l}} \bmod p_{i,l}$ for $l=1, \ldots, L$; (i) generating $J$ random values $r_{i,j}$ where $j=1, \ldots, J$ for the i-th block, such that $0 \leq r_{i,j} < q_j$ for $j=1, \ldots, J$; (j) combining the set of integer cipher element values $c_{i,l}$ for $l=1, \ldots, L$ and the values $r_{i,j}$ for $j=1, \ldots, J$ to form a single integer vector $\{c_{i,1}, c_{i,2}, \ldots, c_{i,L}, r_{i,1}, r_{i,2}, \ldots, r_{i,J}\}$; (k) converting the integer vector $\{c_{i,1}, c_{i,2}, \ldots, c_{i,L}, r_{i,1}, r_{i,2}, \ldots, r_{i,J}\}$ into an integer value $C_i$ using the Chinese remainder theorem and the basis β; and (l) sending the integer value $C_i$ to the receiving correspondent.

The receiving correspondent then performs the following, starting with $i=0$ and repeating steps (m) through (p) to encrypt the i-th block until $i>u$: (m) generating the integer cipher element $c_{i,L}$ modulo $p_{i,L}$ from the integer $C_i$ as $c_{i,L}=C_i \bmod p_{i,L}$; (n) generating the set of integer cipher elements $c_{i,l}$ using the set of elements $\{p_{i,1}, p_{i,2}, \ldots, p_{i,L}\}$ for $l=1, \ldots, L$ from the integer $C_i$ as $c_{i,l}=C_i \bmod p_{i,l}$ for $l=1, \ldots, L$; (o) computing the residue message element values $m_{i,l}$ modulo $p_{i,l}$ as $m_{i,l}=c_{i,l}^{e_{i,l}} \bmod p_{i,l}$ for $l=1, \ldots, L$; and (p) recovering the message bit string of the i-th block from the element values $m_{i,l}$ for $l=1, \ldots, L$.

Example 26

The following alternative embodiment utilizes ECB and both hopping of the encryption basis and hopping of the blind randomization basis, the sending and receiving correspondents both perform the following: (a) agreeing on a set of elements $\{p'_1, p'_2, \ldots, p'_{L'}\}$, where $L'$ is an integer greater than or equal to one, where the elements $\{p'_1, p'_2, \ldots, p'_{L'}\}$ are relatively prime with respect to one another and form a part of a shared secret; (b) agreeing on an integer $e'_l \epsilon Z_{p_l}$ for each element $p'_l$, where $l=1, \ldots, L$, such that $\gcd(e'_l, (p'_l-1))=1$, and where the elements $e'_l$ form a part of the shared secret key; (c) agreeing on a list of codes where each code identifies a different sub set of $(L'-1)$ elements out of the set of $L'$ shared secret elements; (d) agreeing on an element $p_L$ of the set $\{p'_1, p'_2, \ldots, p'_{L'}\}$ that is used to carry information about the code used by the sending correspondent to select a sub-set of elements $\{p'_1, p'_2, \ldots, p'_L\}$ that are used to form the RNS-basis and where the number of codes is $(p_L-1)$; and (e) agreeing on an upper limit for a number of bits to be used to represent a ciphertext.

The sending correspondent then performs the following: (f) selecting a set of elements $\{q'_1, q'_2, \ldots, q'_{J'}\}$ where J' is an integer greater than zero and where the elements $\{q'_1, q'_2, \ldots, q'_{J'}\}$ are relatively prime with respect to one another and which are also relatively prime with respect to the elements $\{p_1, p_2, \ldots, p_L\}$, the set $\{q'_1, q'_2, \ldots, q'_{J'}\}$ being known to the sending correspondent only; starting with i=0, repeating steps (g) through (p) to encrypt the i-th block until i>u: (g) selecting a code from the list of codes agreed upon to select (L−1) elements $\{p_{i,1}, p_{i,2}, \ldots, p_{i,L-1}\}$ from the elements $\{p'_1, p'_2, \ldots, p'_L\}$; (h) randomly selecting a sub-set of elements $\{q_{i,1}, q_{i,2}, \ldots, q_{i,J}\}$ from the set $\{q'_1, q'_2, \ldots, q'_{J'}\}$, where the number of bits needed to represent $$\prod_{l=1}^{L} p_l \prod_{j=1}^{J} q_j$$

is within the upper limit agreed upon by the sending and receiving correspondents; (i) forming the residue number system basis β as $\{p_{i,1}, p_{i,2}, \ldots, p_{i,L}, q_{i,1}, q_{i,2}, \ldots, q_{i,J}\}$; (j) embedding message bit strings into (L−1) integer values $m_{i,l}$, where $1 \leq l, \ldots, l-1$, such that $0 \leq m_{i,l} < p_l$ for $l=1, \ldots, L-1$; (k) embedding message bit strings of the code used by the sending correspondent to select the (L−1) elements $\{p_{i,1}, p_{i,2}, \ldots, p_{i,L-1}\}$ for the i-th block into the integer values $m_{i,L}$, such that $0 \leq m_{i,L} < p_L$; (l) computing a set of integer cipher elements $c_{i,l}$ modulo pit as $c_{i,l} = m_{i,l}^{d_{i,l}} \mod p_{i,l}$ for $l=1, \ldots, L-1$; (m) generating J random values $r_{i,j}$, where $j=1, \ldots, J$ for the i-th block, such that $0 \leq r_j < q_j$ for $j=1, \ldots, J$; (n) combining the set of integer cipher element values $c_{i,l}$ for $l=1, \ldots, L$ and the values $r_{i,j}$ for $j=1, \ldots, J$ to form a single integer vector $\{c_{i,1}, c_{i,2}, \ldots, c_{i,L}, r_{i,1}, r_{i,2}, \ldots, r_{i,J}\}$; (o) converting the integer vector $\{c_{i,1}, c_{i,2}, \ldots, c_{i,L}, r_{i,1}, r_{i,2}, \ldots, r_{i,J}\}$ into an integer value $C_i$ using the Chinese remainder theorem and the basis β; and (p) sending the integer value $C_i$ to the receiving correspondent.

The receiving correspondent then performs the following, starting with i=0 and repeating steps (q) through (v) to encrypt the i-th block until i>u: (q) generating the integer cipher element $c_{i,L}$ modulo $p_{i,L}$ from the integer $C_i$ as $c_{i,L} = C_i \mod p_{i,L}$; (r) computing the message element values $m_{i,L}$ modulo $p_{i,L}$ as $m_{i,L} = c_{i,L} \cdot g_{i,L}^{k_L} \mod P_{i,L}$; (s) recovering the code used define the set $\{p_{i,1}, p_{i,2}, \ldots, p_{i,L-1}\}$ from the element value $m_{i,L}$; (t) generating the set of integer cipher elements $c_{i,l}$ using the set of elements $\{p_{i,1}, p_{i,2}, \ldots, p_{i,L-1}\}$ for $l=1, \ldots, L-1$ from the integer $c_l$ as $c_{i,l} = C_i \mod p_{i,l}$ for $l=1, \ldots, L-1$; (u) computing the message element values $m_{i,l}$ modulo $p_{i,l}$ as $m_{i,l} = c_{i,l}^{e_{i,l}} \mod p_{i,l}$ for $l=1, \ldots, L-1$; and (v) recovering the message bit string of the i-th block from the element values $'m_{i,l}$ for $l=1, \ldots, L-1$.

Example 27

In the following examples, it is assumed that the maximum block size that can be embedded into the L residue values $\{m_1, m_2, \ldots, m_L\}$ is N, and that the message data bit string length is a multiple of N, such as uN. In other words, the number of blocks is u.

This example uses cipher block chaining (CBC) for block streams. The sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis β given as $\beta = \{p_1, p_2, \ldots, p_L\}$; (b) agreeing on an integer $k_l \in Z_{p_l}$ for each element $p_l$, where $l=1, \ldots, L$, where each $k_l$ forms a part of the shared secret; (c) agreeing on an integer $g_l \in Z_{p_l}$ for each element $p_l$, where $l=1, \ldots, L$, such that $g_l^{-1} \mod p_l$ exists, such that the integers $g_l$ could be part of the shared secret key or could be made public. The integers $g_l$ may also be chosen such that $g_i = g_j$ for $i \leq 1, \ldots, L$ and $j=1, \ldots, L$; (d) agreeing on L random values $mc_{-1,j}$ for $j=1, \ldots, L$, such that $0 \leq mc_j < p_j$ for $j=1, \ldots, L$, the random values $mc_{-1,j}$ being used as the initial vector for block chaining; and (e) agreeing on an upper limit for a number of bits to be used to represent a ciphertext.

The sending correspondent then performs the following: (f) embedding message bit strings of the i-th block into L integer values $m_{i,l}$, where $l=1, \ldots, L$, such that $0 \leq m_{i,l} < p_l$ for $l=1, \ldots, L$; (g) computing the set of chained values $m_{i,l}$ for $l=1, \ldots, L$ as $mc_{i,l} = mc_{i-1,l} + m_{i,l}$; (h) computing a set of integer cipher elements $c_{i,l}$ modulo $p_l$ as $c_{i,l} = mc_{i,l} \cdot (g_l^{-1})^{k_l} \mod p_l$ for $l=1, \ldots, L$; (i) combining the set of integer cipher element values $c_{i,l}$ for $l=1, \ldots, L$ to form a single integer vector $\{c_{i,1}, c_{i,2}, \ldots, c_{i,L}\}$; (j) converting the integer vector $\{c_{i,1}, c_{i,2}, \ldots, c_{i,L}\}$ into an integer value $C_i$ using the Chinese remainder theorem and the basis β; and (k) sending the integer value $c_i$ to the receiving correspondent.

The receiving correspondent then performs the following: (l) generating the set of integer cipher elements $c_{i,l}$ using the set of elements $\{p_1, p_2, \ldots, p_L\}$ for $l=1, \ldots, L$ from the integer $C_i$ as $c_{i,l} = C_i \mod p_{i,l}$; (m) computing the message element values $mc_{i,l}$ as $mc_j = c_j \cdot g_l^{k_j} \mod p_l$ for $l=1, \ldots, L$; and (n) recovering the message bit string of the i-th block from the element values $m_{i,l}$ for $l=1, \ldots, L$.

Example 28

The following enhanced embodiment uses CBC for block streams, the sending and receiving correspondents both perform the following: (a) agreeing on a set of elements $\{p_1, p_2, \ldots, p_L\}$, where L is an integer greater than or equal to one, where the elements $\{p_1, p_2, \ldots, p_L\}$ are relatively prime with respect to one another and form a part of a shared secret, and which are further used as a residue number system basis β given as $\beta = \{p_1, p_2, \ldots, p_L\}$; (b) agreeing on an integer $e_l \in Z_{p_l}$ for each element $p_l$, where $l=1, \ldots, L$, such that $\gcd(e_l, (p_l-1))=1$, and where the elements $e_l$ form a part of the shared secret key; (c) agreeing on L random values $mc_{-1,j}$, for $j=1, \ldots, L$, such that $0 \leq mc_j < p_j$ for $j=1, \ldots, L$, the random values $mc_{-1,j}$ being used as the initial vector for block chaining; and (d) agreeing on an upper limit for a number of bits to be used to represent a ciphertext.

The sending correspondent then performs the following, starting with i=0 and repeating steps (e) through (k) until i>u: (e) computing an integer $d_l$ for each element $p_l$ for $l=1, \ldots, L$, such that $e_l d_l \mod p_l = 1$; (f) embedding message bit strings into L integer values $m_{i,l}$, where $l=1, \ldots, L$, such that $0 \leq m_{i,l} < p_l$ for $l=1, \ldots, L$; (g) computing a set of chained residue values $mc_{i,l}$ for $l=1, \ldots, L$ as $c_{i,l} = mc_{i-1,l}$; (h) computing a set of integer cipher elements $c_{i,l}$ modulo $p_l$ as $c_j = m_{i,l}^{d_l} \mod p_l$ for $l=1, \ldots, L$; (i) combining the set of integer cipher element values $c_{i,l}$ for $l=1, \ldots, L$ to form a single integer vector $\{c_1, c_2, \ldots, c_L\}$; (j) converting the integer vector $\{c_1, c_2, \ldots, c_L\}$ into an integer value $C_i$ using the Chinese remainder theorem and the basis β; and (k) sending the integer value $C_i$ to the receiving correspondent.

The receiving correspondent then performs the following, starting with i=0 and repeating steps (l) through ( ) until i>u: (l) generating the set of integer cipher elements $c_{i,l}$ using the set of elements $\{p_1, p_2, \ldots, p_L\}$ for l=1, ..., L from the integer $C_i$ as $c_{i,l} = C_i \bmod p_l$; (m) computing the message element values $mc_{i,l}$ modulo $p_l$ as $mc_{i,l} = c_{i,l}^{e_{i,l}} \bmod p_{i,l}$ for l=1, ..., L; (n) computing the values $m_{i,l}$ as $m_{i,l} = mc_{i,l} - mc_{i-1,l}$ for l=1, ..., L; and (o) recovering the message bit strings and the corresponding parity bits from the element values $m_l$ for l=1, ..., L.

Example 29

The following embodiment also uses CBC for block streams: The sending and receiving correspondents both perform the following: (a) agreeing on a set of elements $\{p'_1, p'_2, \ldots, p'_{L'}\}$, where L' is an integer greater than or equal to one, where the elements $\{p'_1, p'_2, \ldots, p'_{L'}\}$ are relatively prime with respect to one another and form a part of a shared secret; (b) agreeing on an integer $e'_l \in Z_{p_l}$ for each element $p'_l$, where l=1, ..., L, such that $\gcd(e'_l, (p'_l-1))=1$, and where the elements $e'_l$ form a part of a shared secret key; (c) agreeing on a list of codes where each code identifies a different sub set of (L−1) elements out of the set of L' shared secret elements; (d) agreeing on an element $p_L$ of the set $\{p'_1, p'_2, \ldots, p'_{L'}\}$ that is used to carry information about the code used by the sending correspondent to select a sub-set of elements $\{p'_1, p'_2, \ldots, p'_{L'}\}$ that are used to form the RNS-basis and where the number of codes is $(p_L-1)$; (e) agreeing on L random values $mc_{-1,j}$, for j=1, ..., L, such that $0 \leq mc_j < p_j$ for j=1, ..., L, the random values $mc_{-1,j}$ being used as the initial vector for block chaining; and (f) agreeing on an upper limit for a number of bits to be used to represent a ciphertext.

The sending correspondent then performs the following: (g) computing an integer $d'_l$ for each element $p'_l$ for l=1, ..., L, such that $e'_l d'_l \bmod p'_l = 1$; starting with i=0, repeating steps (h) through (o) to encrypt the i-th block until i>u: (h) selecting a code from the list of codes agreed upon to select (L−1) elements $\{p_{i,1}, p_{i,2}, \ldots p_{i,L-1}\}$ from me elements $\{p'_1, p'_2, \ldots, p'_{L'}\}$ to form the residue number system basis β as $\{p_{i,1}, p_{i,2}, \ldots p_{i,L}\}$; (i) embedding message bit strings into (L−1) integer values $m_{i,l}$, where l=1, ..., L−1, such that $0 \leq m_{i,l} < p_l$ for l=1, ..., L−1; (j) embedding message bit strings of the code used by the sending correspondent to select the (L−1) elements $\{p_{i,1}, p_{i,2}, \ldots p_{i,L-1}\}$ for the i-th block into the integer values $m_{i,L}$, such that $0 \leq m_{i,L} < p_L$; (k) computing a set of chained residue values $mc_{i,l}$ for l=1, ..., L as $mc_{i,l} = mc_{i-1,l} + m_{i,l}$; (l) computing a set of integer cipher elements $c_{i,l}$ modulo $p_l$ as $c_{i,l} = m_{i,l}^{d_l} \bmod p_l$ for l=1, ..., L; (m) combining the set of integer cipher element values $c_{i,l}$ for l=1, ..., L to form a single integer vector $\{c_{i,1}, c_{i,2}, \ldots, c_{i,L}\}$; (n) converting the integer vector $\{c_{i,1}, c_{i,2}, \ldots, c_{i,L}\}$ into an integer value $C_i$ using the Chinese remainder theorem and the basis β; and (o) sending the integer value $C_i$ to the receiving correspondent.

The receiving correspondent then performs the following, starting with i=0 and repeating steps (p) through (w) to encrypt the i-th block until i>u: (p) generating the integer cipher element $c_{i,L}$ modulo $p_{i,L}$ from the integer $C_i$ as $c_{i,L} = C_i \bmod p_{i,L}$; (q) computing the message element value $m_{i,L}$ modulo $p_{i,L}$ as $m_{i,L} = c_{i,L}^{e_{i,L}} \bmod p_{i,L}$; (r) computing the set of values $m_{i,L}$ as $m_{i,L} = mc_{i,L} = mc_{i,L} - mc_{i-1,L}$; (s) recovering the code used define the set $\{p_{i,1}, p_{i,2}, \ldots, p_{i,L-1}\}$ from the element value $m_{i,L}$; (t) generating the set of integer cipher elements $c_{i,l}$ using the set of elements $\{p_{i,1}, p_{i,2}, \ldots, p_{i,L-1}\}$ for l=1, ..., L−1 from the integer $C_i$ as $c_{i,l} = C_i \bmod p_{i,l}$ for l=1, ..., L−1; (u) computing the values $mc_{i,l}$ as $m_{i,l} = c_{i,l}^{e_{i,l}} \bmod p_{i,l}$ for l=1, ..., L; (v) computing the message element values $m_{i,l}$ as $m_{i,l} = mc_{i,l} = mc_{i-1,l}$ for l=1, ..., L; and (w) recovering the message bit string of the i-th block from the element values $m_{i,l}$ for l=1, ..., L−1.

In several of the above embodiments, the elements of an RNS basis are selected from a predefined set of prime or relatively prime numbers. Assuming that $\{z'_1, z'_2, \ldots, z'_{L'}\}$ represents a predefined set of prime numbers, then one simple method of using a code to identify the selected elements used in an RNS basis is to use a code with L' bits. Assuming that the set $\{z'_1, z'_2, \ldots, z'_{L'}\}$ is ordered in a decreasing value, then there are $2^{L'}$ possible subsets of the set $\{z'_1, z'_2, \ldots, z'_{L'}\}$, and, thus, there are $2^{L'}$ possible RNS bases to choose from. The code to identify which subset is used can be constructed as follows: If the l-th bit of the L' bit code is set to one, this implies that element $z'_l$ is used, and if the l-th bit of the L' bit code is set to zero, this implies that element $z'_l$ is not used.

To ensure random selection, the L' bit code needs to be generated by a random number generator. Any suitable conventional binary random number generators modulo $2^{L'}$ may be used, such as those shown in U.S. Pat. No. 5,077,793, which is hereby incorporated by reference in its entirety.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

In the above, two computational "hard" problems have been used in the design of the cryptography algorithms. These are: integer factorization and the discrete logarithm problem. The integer factorization problem can be stated as follows: given an integer n, find the prime numbers $\{p_1, p_2, \ldots, p_L\}$ such that $$n = \prod_{l=1}^{L} p_l.$$

The security strength of the protocols described above is based on hiding the RNS basis β. The only information an attacker has to gain knowledge about the basis is the number of bits used to represent the ciphertext, $N_C$. The strength of the above protocols therefore depends on solving the following problem: Given the maximum number of bits used to represent an integer P, $N_c$, find the integer P and the set $\{p_1, p_2, \ldots, p_L\}$ such that $$P = \prod_{l=1}^{L} p_l$$

and $P<2^{N_c}$.

Thus, finding elements $\{p_1, p_2, \ldots, p_L\}$ of the basis $\beta$ is equivalent to integer factorization, where only the upper bound of the integer is known. Therefore, one can conclude the following: the security of the RNS-based block cipher is dependent on a well known mathematically hard problem; and the integer to be factorized is not known and the only information that is known is its upper bound. Thus, the security of the above protocols depends on problems that are computationally harder than conventional factorization, since the integer value $$P = \prod_{l=1}^{L} p_l$$

is not known. This harder problem is referred to as "blind factorization" in the above. It should be noted that blind integer factorization is an even harder problem to solve than the normal factorization problem.

It will be understood that the methods described herein may be carried out on any cryptographic device, which may be a computer, a PDA, a smart phone, etc.

It is to be understood that the present invention is not limited to the embodiments described above, but encompasses any and all embodiments within the scope of the following claims.

We claim:

1. A Residue Number System (RNS)-based cryptographic method for encrypted communications over a communications channel using a cryptographic device, comprising the steps of:
embedding data strings corresponding to a plaintext message into a set of message integers, the message integers being residues of corresponding elements of a basis of the residue number system having elements relatively prime pairwise to each other, the basis being previously agreed upon and kept secret;
forming a set of cipher elements by raising each of the message integers to a first non-zero integer power, multiplying by a selected integer raised to a second power, and taking the result modulo the corresponding element of the basis, the first and second powers being previously agreed upon and kept secret;
combining the set of cipher elements to form a cipher integer vector;
converting the cipher integer vector into a cipher integer value using corresponding elements of the basis and the Chinese Remainder Theorem;
sending the cipher integer value to a receiving correspondent;
upon receipt of the message encrypted into a cipher integer value, converting the received cipher integer value to a set of cipher elements by determining the residues of the received cipher integer value modulo the corresponding elements of the basis;
converting the cipher elements of the received message to the corresponding message integers using a corresponding correlate of the agreed upon secret first power, secret second power, and the inverse of the selected integer modulo the corresponding element of the basis; and
recovering the plaintext message from the message integers.

2. The RNS-based cryptographic method according to claim 1, wherein:
the first power is equal to 1;
the second power comprises a set of second powers, each of the elements of the basis having a corresponding element of the set of second powers associated therewith; and
the selected integer comprises a set of selected integers, each of the elements of the set of selected integers being a modular inverse of an agreed upon reference integer corresponding to an element of the basis.

3. The RNS-based cryptographic method according to claim 2, wherein the reference integers are public.

4. The RNS-based cryptographic method according to claim 2, wherein the reference integers are kept secret.

5. The RNS-based cryptographic method according to claim 2, wherein each of the message integers having a plaintext message embedded therein includes a parity bit; and the method further comprises including a message integer equal to the sum of all of the plaintext-embedded message integers modulo an agreed element of the basis.

6. The RNS-based cryptographic method according to claim 1, wherein:
the first power is equal to 1;
the second power consists of a single integer; and
the selected integer consists of a single selected integer, the single selected integer being a modular inverse of an agreed upon reference integer.

7. The RNS-based cryptographic method according to claim 1, wherein:
the first power is equal to 1;
the second power is equal to 1; and
the selected integer consists of a single selected integer for each block of ciphertext, the single selected integer being a modular inverse of an agreed upon reference integer, the method further comprising the steps of changing the selected integer for at least one block of ciphertext and setting an agreed upon element of the set of cipher elements equal to the selected integer.

8. The RNS-based cryptographic method according to claim 1, wherein:
the first power is equal to 1;
the second power is equal to 0;
the elements of the basis are configured in decreasing order;
the first cipher element is equal to a key integer applicable to at least one block of ciphertext;
the second cipher element is equal to the first message integer multiplied by the modular inverse of the key integer modulo the second element of the basis; and
succeeding cipher elements are equal to the residue of the sum of the succeeding message integers and the immediately preceding message integer modulo the corresponding element of the basis.

9. The RNS-based cryptographic method according to claim 1, wherein:
the second power is equal to 0; and
the first power comprises a set of first powers, each of the elements of the basis having a corresponding element of the set of first powers correlated therewith, each element of the set of first powers being a modular inverse of an element of a set of keys modulo the element of the basis correlated with the corresponding element of the set of first powers and the element of the set of keys.

10. The RNS-based cryptographic method according to claim 9, wherein the set of keys are shared secret keys.

11. The RNS-based cryptographic method according to claim 9, wherein the set of keys are public keys.

12. The RNS-based cryptographic method according to claim 9, wherein each of the message integers having a plaintext message embedded therein includes a parity bit; and the method further comprises including a message integer equal to the sum of all of the plaintext-embedded message integers modulo an agreed element of the basis.

13. The RNS-based cryptographic method according to claim 1, wherein:
the second power is equal to 0;
the first power is an element of a set of integer exponents correlated with the elements of the basis; and
the method further comprises a set of public integers equal to the sum of the set of integer exponents and an integer multiple of the corresponding elements of the basis correlated with the integer exponents.

14. The RNS-based cryptographic method according to claim 1, wherein:
the second power is equal to 0;
the first power is an element of a single integer exponent;
the first cipher element is equal to the first message integer raised to the integer exponent modulo the first element of the basis; and
the remaining cipher elements are equal to the sum of the next message integer and the previous message integer modulo the element of the basis correlated with the next message integer.

15. The RNS-based cryptographic method according to claim 1, further comprising the steps of:
forming a supplemental basis containing elements relatively prime to each other pairwise and also relatively prime to the elements of the basis used in said embedding step, the supplemental basis being kept secret and being formed without agreement with another party;
concatenating the supplemental basis with the basis used in said embedding step to form a randomization basis;
generating a set of random integers correlated with the elements of the supplemental basis;
after said combining step and before said converting step, concatenating the set of random numbers with the cipher integer vector to form a randomized cipher integer vector; and
in said converting step, converting the randomized cipher integer vector into the cipher integer value using corresponding elements of the randomization basis and the Chinese Remainder Theorem.

16. The RNS-based cryptographic method according to claim 15, further comprising the step of changing the supplemental basis in successive blocks when the plaintext message requires more than one block of ciphertext.

17. The RNS-based cryptographic method according to claim 15, further comprising the step of changing the supplemental basis to different subsets of the supplemental basis in successive blocks when the plaintext message requires more than one block of ciphertext.

18. The RNS-based cryptographic method according to claim 17, wherein said embedding step further comprises selecting different elements of the basis used in said embedding step for embedding the plaintext message in successive blocks, the method further comprising the steps of:
selecting an agreed code to indicate which elements of the basis used in said embedding step are used for embedding the plaintext message in each block; and
setting an agreed cipher element in each of the blocks equal to the agreed code corresponding to that block.

19. The RNS-based cryptographic method according to claim 1, wherein said embedding step further comprises selecting different elements of the basis used in said embedding step for embedding the plaintext message in successive blocks, the method further comprising the steps of:
selecting an agreed code to indicate which elements of the basis used in said embedding step are used for embedding the plaintext message in each block; and
setting an agreed cipher element in each of the blocks equal to the agreed code corresponding to that block.

20. The RNS-based cryptographic method according to claim 1, wherein the first power is equal to 0 and the plaintext message has a length requiring a plurality of ciphertext blocks, the method further comprising the steps of:
setting the message integers in the first ciphertext block equal to random values; and
before said forming step, for blocks succeeding the first block, adding the message integers in the succeeding block to the corresponding message integers in the previous block.

21. The RNS-based cryptographic method according to claim 1, wherein the second power is equal to 1 and the plaintext message has a length requiring a plurality of ciphertext blocks, the method further comprising the steps of:
setting the message integers in the first ciphertext block equal to random values; and
before said forming step, for blocks succeeding the first block, adding the message integers in the succeeding block to the corresponding message integers in the previous block.

22. The RNS-based cryptographic method according to claim 21, wherein said embedding step further comprises selecting different elements of the basis used in said embedding step for embedding the plaintext message in successive blocks, the method further comprising the steps of:
selecting an agreed code to indicate which elements of the basis used in said embedding step are used for embedding the plaintext message in each block; and
for blocks after the first ciphertext block, setting an agreed cipher element in each of the blocks equal to the agreed code corresponding to that block.

23. A Residue Number System, RNS-based cryptographic method for encrypted communications over a communications channel using a cryptographic device, comprising the steps of:
embedding data strings corresponding to a plaintext message into a set of message integers, the message integers being residues of corresponding elements of a basis of a residue number system having elements relatively prime pairwise to each other, the basis being previously agreed upon and kept secret;
forming a supplemental basis containing elements relatively prime to each other pairwise and also relatively prime to the elements of the basis used in said embedding step, the supplemental basis being kept secret and being formed without agreement with another party;

concatenating the supplemental basis with the basis used in said embedding step to form a randomization basis;

generating a set of random integers correlated with the elements of the supplemental basis;

forming a set of cipher elements by raising each of the message integers to a first non-zero integer power, multiplying by a selected integer raised to a second power, and taking the result modulo the corresponding element of the basis, the first and second powers being previously agreed upon and kept secret;

concatenating the set of random numbers with the cipher elements to form a randomized set of cipher elements;

combining the set of randomized cipher elements to form a cipher integer vector;

converting the cipher integer vector into a cipher integer value using corresponding elements of the basis and the Chinese Remainder Theorem;

sending the cipher integer value to a receiving correspondent;

upon receipt of the message encrypted into a cipher integer value, converting the received cipher integer value to a set of cipher elements by determining the residues of the received cipher integer value modulo the corresponding elements of the basis;

converting the cipher elements of the received message to the corresponding message integers using a corresponding correlate of the agreed upon secret first power, secret second power, and the inverse of the selected integer modulo the corresponding element of the basis; and recovering the plaintext message from the message integers.

24. The RNS-based cryptographic method according to claim 23, wherein:

the first power is equal to 1;

the second power comprises a set of second powers, each of the elements of the basis having a corresponding element of the set of second powers associated therewith; and the selected integer comprises a set of selected integers, each of the elements of the set of selected integers being a modular inverse of an agreed upon reference integer corresponding to an element of the basis.

25. The RNS-based cryptographic method according to claim 23, wherein:

the second power is equal to 0; and the first power comprises a set of first powers, each of the elements of the basis having a corresponding element of the set of first powers correlated therewith, each element of the set of first powers being a modular inverse of an element of a set of keys modulo the element of the basis correlated with the corresponding element of the set of first powers and the element of the set of keys.

* * * * *